US012652718B2

(12) United States Patent
Santhanam et al.

(10) Patent No.: US 12,652,718 B2
(45) Date of Patent: Jun. 9, 2026

(54) REDCAP UE FALLBACK

(71) Applicant: QUALCOMM Incorporated, San Diego, CA (US)

(72) Inventors: Arvind Vardarajan Santhanam, San Diego, CA (US); Shanshan Wang, San Diego, CA (US); Reza Shahidi, La Jolla, CA (US); Liangchi Hsu, San Diego, CA (US); Kuo-Chun Lee, San Diego, CA (US); Leena Zacharias, San Jose, CA (US); Girish Khandelwal, San Diego, CA (US); Kai Tang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 18/473,932

(22) Filed: Sep. 25, 2023

(65) Prior Publication Data

US 2025/0031264 A1     Jan. 23, 2025

Related U.S. Application Data

(63) Continuation-in-part of application No. 18/353,533, filed on Jul. 17, 2023.

(51) Int. Cl.
H04W 76/19        (2018.01)
H04W 8/22        (2009.01)
(Continued)

(52) U.S. Cl.
CPC .............. H04W 76/19 (2018.02); H04W 8/22 (2013.01); H04W 8/24 (2013.01); H04W 48/20 (2013.01)

(58) Field of Classification Search
CPC ......... H04W 76/19; H04W 8/22; H04W 8/24; H04W 48/20
See application file for complete search history.

(56) References Cited

U.S. PATENT DOCUMENTS

2019/0357037 A1*  11/2019  Velev ..................... H04W 60/04
2021/0105694 A1*   4/2021  Jia ......................... H04B 7/0486
(Continued)

OTHER PUBLICATIONS

NEC: "Discussion on Allowing RedCap UEs to Be Served as Normal UEs in Legacy Cells", 3GPP TSG-RAN WG2 #116bis-e, R2-2200350, 3rd Generation Partnership Project, Mobile Competence Centre, 650, Route Des Lucioles, F-06921 Sophia-Antipolis Cedex, France, vol. RAN WG2, No. Electronic meeting, Jan. 17, 2022-Jan. 25, 2022, Jan. 11, 2022, 3 Pages, XP052093529, section "2. Discussion".

(Continued)

*Primary Examiner* — Redentor Pasia
(74) *Attorney, Agent, or Firm* — Procopio, Cory, Hargreaves & Savitch LLP/Qualcomm

(57)        ABSTRACT

A method for wireless communication at a user equipment (UE) and related apparatus are provided. In the method, the UE identify, based on a support of a cell for the UE operating with reduced capability, a cell type of the cell. The cell type is one of a reduced capability (RC) type, a fallback (FB) type, or a neither (N) type, corresponding to various support for the UE operating with the reduced capability. The UE further configures a device mode, where the device mode includes an RC mode or a FB-allowed mode, and manages the connection between the UE and the cell based on the device mode and the cell type.

20 Claims, 17 Drawing Sheets

(51) Int. Cl.
  *H04W 8/24*     (2009.01)
  *H04W 48/20*    (2009.01)

(56)         References Cited

U.S. PATENT DOCUMENTS

| | | | | |
|---|---|---|---|---|
| 2022/0417811 A1* | 12/2022 | Xin | ....................... | H04W 36/06 |
| 2023/0123249 A1 | 4/2023 | He et al. | | |
| 2023/0199618 A1* | 6/2023 | Ohlsson | ................ | H04W 48/10 |
| | | | | 370/328 |
| 2023/0217498 A1* | 7/2023 | Lee | .................... | H04W 74/002 |
| | | | | 370/329 |
| 2024/0147222 A1* | 5/2024 | Hu | ........................ | H04W 8/005 |
| 2025/0031100 A1 | 1/2025 | Santhanam et al. | | |

OTHER PUBLICATIONS

Partial International Search Report—PCT/US2024/037901—ISA/
EPO—Oct. 28, 2024—13 pages.
International Search Report and Written Opinion—PCT/US2024/
037901—ISA/EPO—Dec. 20, 2024—21 pages.

\* cited by examiner gNB 412
supporting RedCap UE

RedCap (RC)

gNB 414
supporting ≤ 20 MHz RedCap UE

Fallback (FB)

gNB 416
not supporting ≤ 20 MHz RedCap UE

Neither (N)

SIB1 (redCap-ConfigCommon)

SIB1

SIB1

RedCap device

UE
402

400

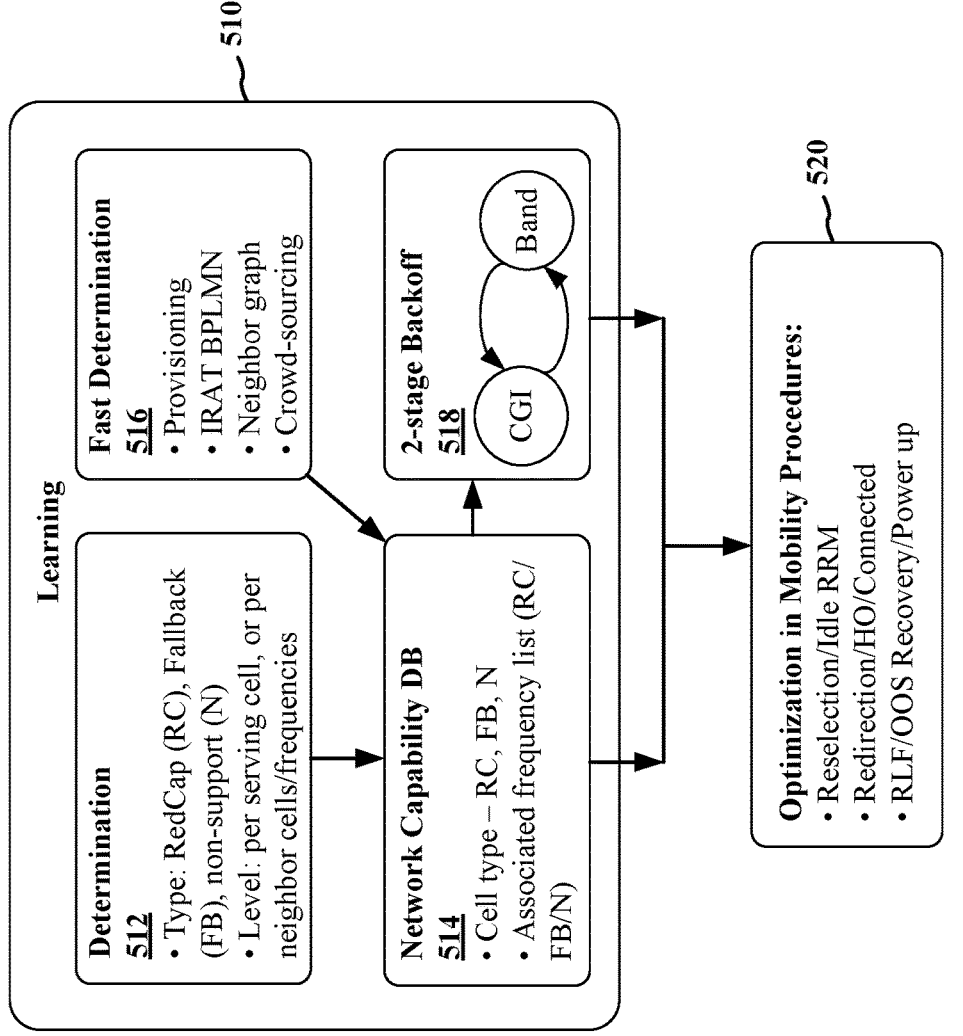
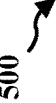
FIG. 5

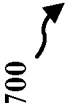
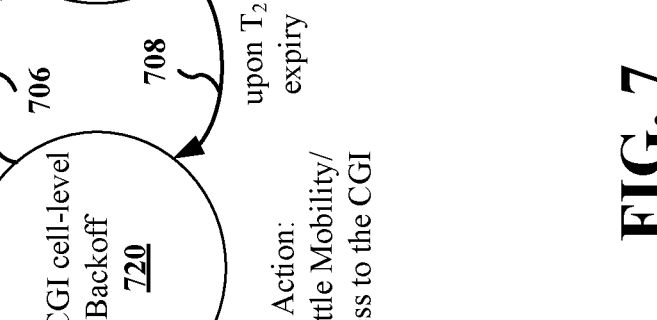
FIG. 7 identify, based on a support of a cell for the UE operating with reduced capability, a cell type of the cell, wherein the cell type is one of a RC type, a FB type, or a N type ⟋902 manage, based on the cell type, a connection between the UE and the cell ⟋904

900

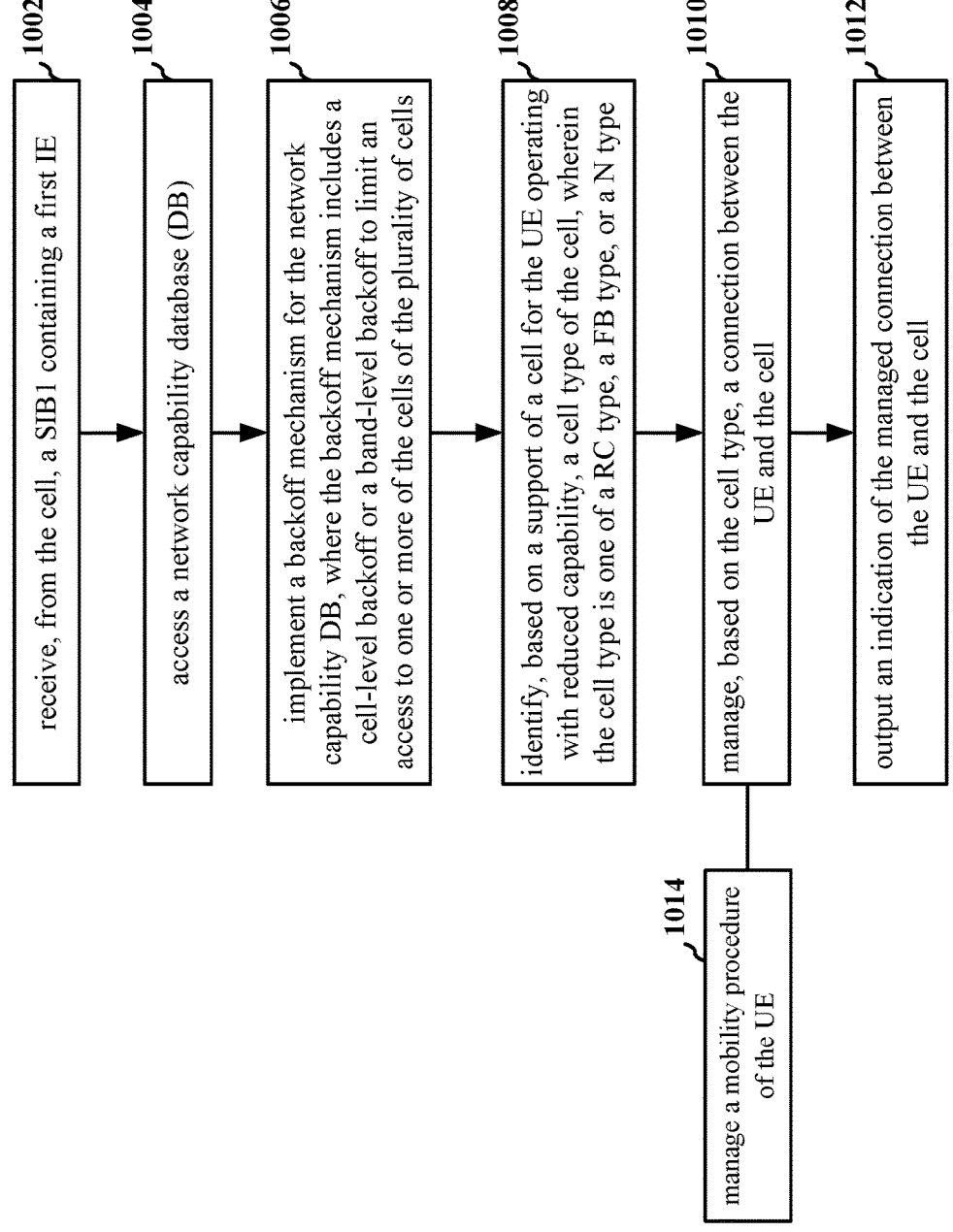

1002　receive, from the cell, a SIB1 containing a first IE 1004　access a network capability database (DB)

1006　implement a backoff mechanism for the network capability DB, where the backoff mechanism includes a cell-level backoff or a band-level backoff to limit an access to one or more of the cells of the plurality of cells 1008　identify, based on a support of a cell for the UE operating with reduced capability, a cell type of the cell, wherein the cell type is one of a RC type, a FB type, or a N type 1010　manage, based on the cell type, a connection between the UE and the cell 1012　output an indication of the managed connection between the UE and the cell 1014　manage a mobility procedure of the UE

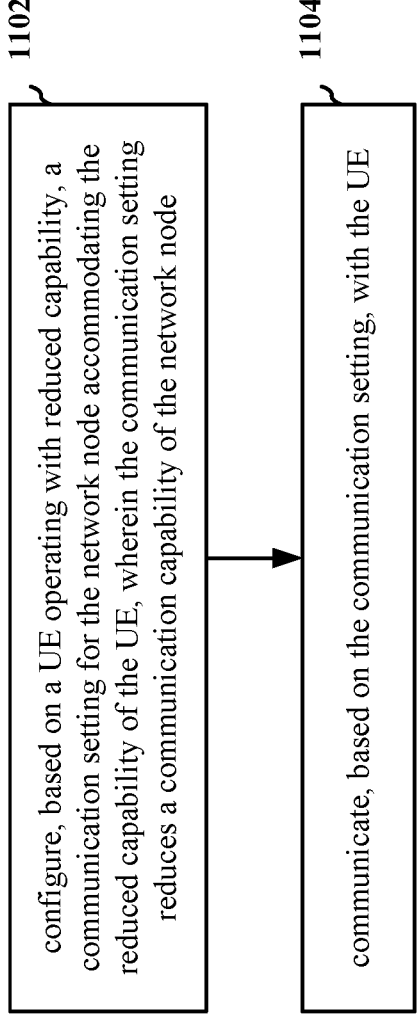
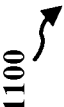
configure, based on a UE operating with reduced capability, a communication setting for the network node accommodating the reduced capability of the UE, wherein the communication setting reduces a communication capability of the network node
communicate, based on the communication setting, with the UE
1102
1104
1100
FIG. 11

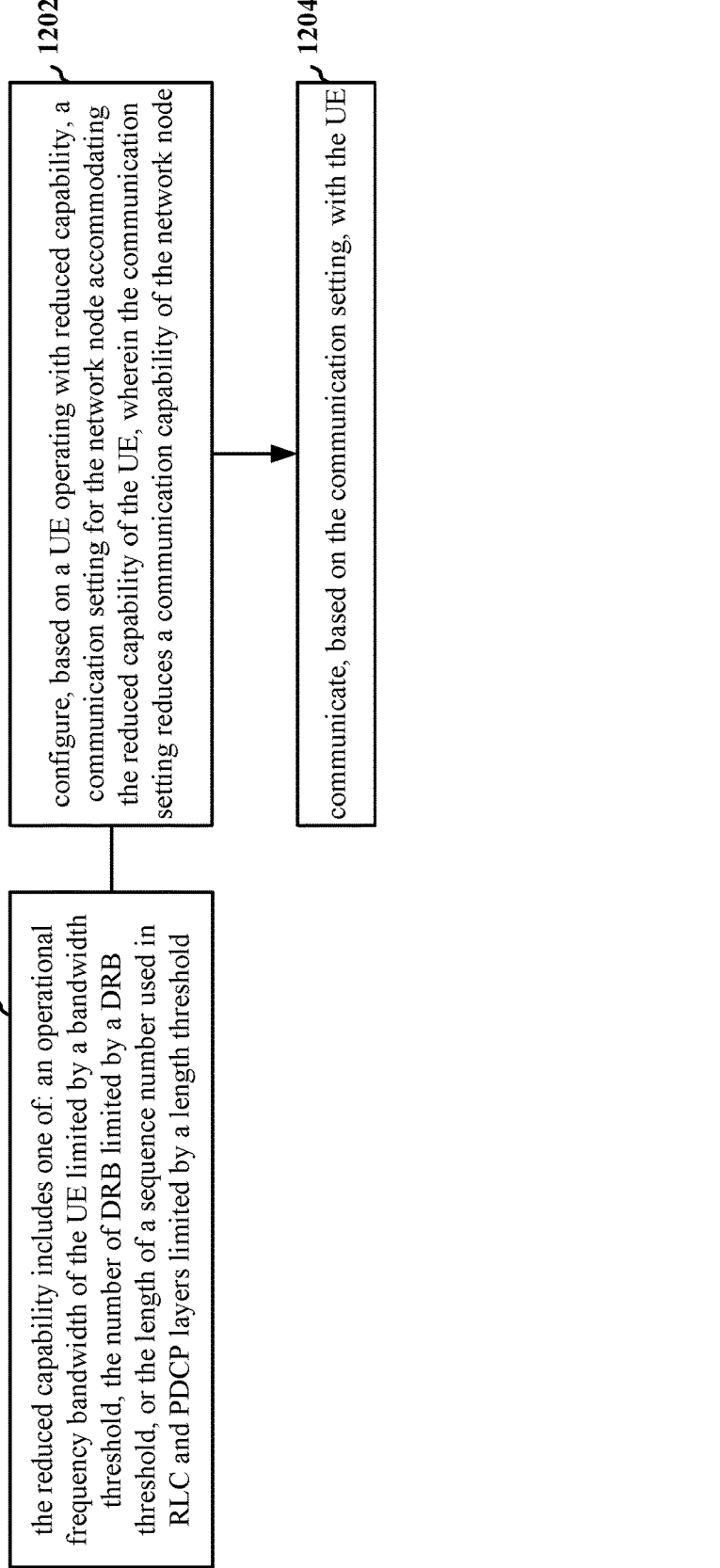

1200

1202 configure, based on a UE operating with reduced capability, a communication setting for the network node accommodating the reduced capability of the UE, wherein the communication setting reduces a communication capability of the network node

1204 communicate, based on the communication setting, with the UE

1206 the reduced capability includes one of: an operational frequency bandwidth of the UE limited by a bandwidth threshold, the number of DRB limited by a DRB threshold, or the length of a sequence number used in RLC and PDCP layers limited by a length threshold

FIG. 12

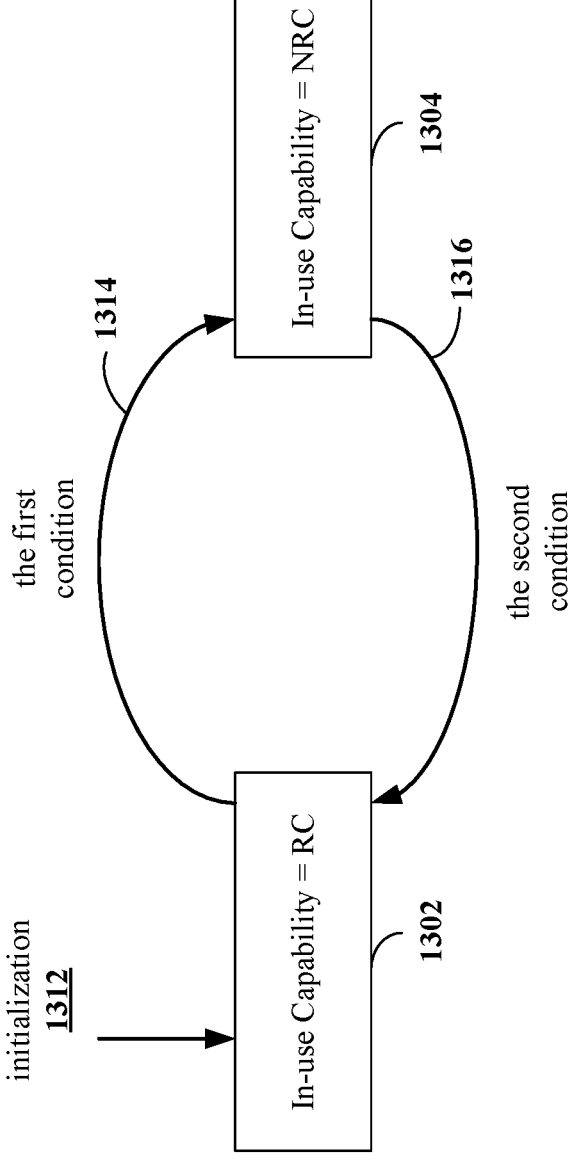
FIG. 13

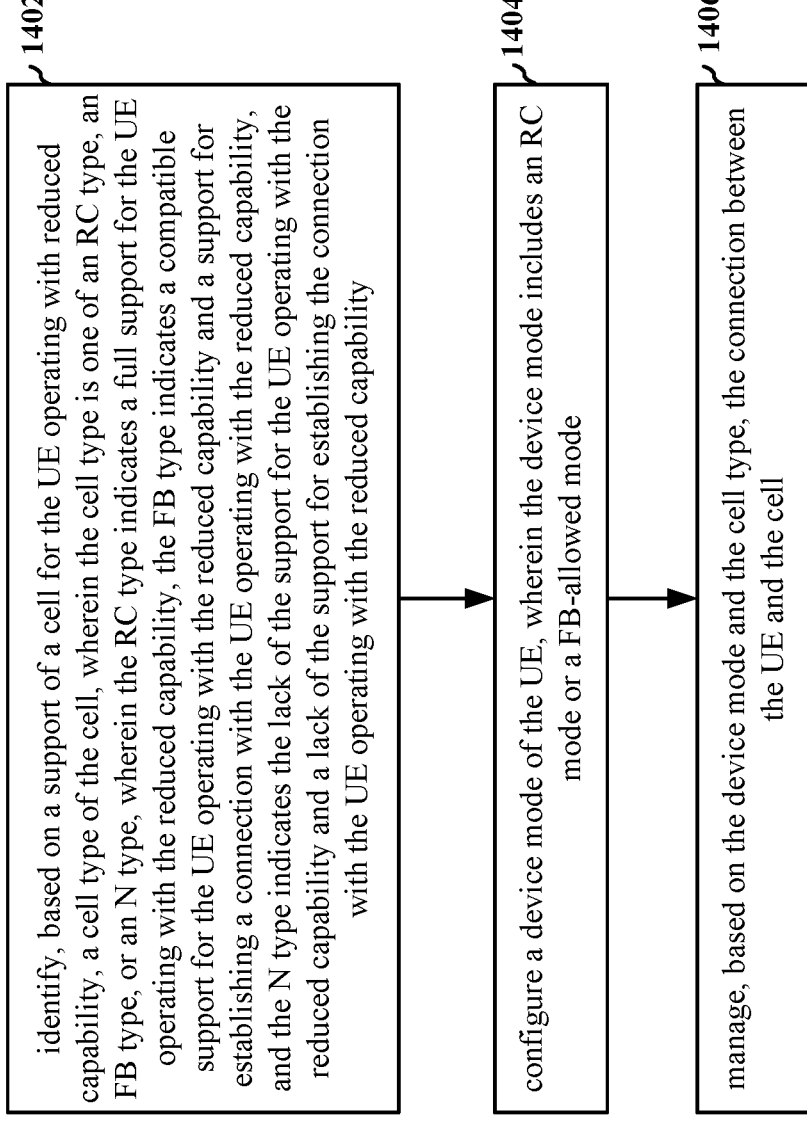

1402 identify, based on a support of a cell for the UE operating with reduced capability, a cell type of the cell, wherein the cell type is one of an RC type, an FB type, or an N type, wherein the RC type indicates a full support for the UE operating with the reduced capability, the FB type indicates a compatible support for the UE operating with the reduced capability and a support for establishing a connection with the UE operating with the reduced capability, and the N type indicates the lack of the support for the UE operating with the reduced capability and a lack of the support for establishing the connection with the UE operating with the reduced capability

1404 configure a device mode of the UE, wherein the device mode includes an RC mode or a FB-allowed mode

1406 manage, based on the device mode and the cell type, the connection between the UE and the cell

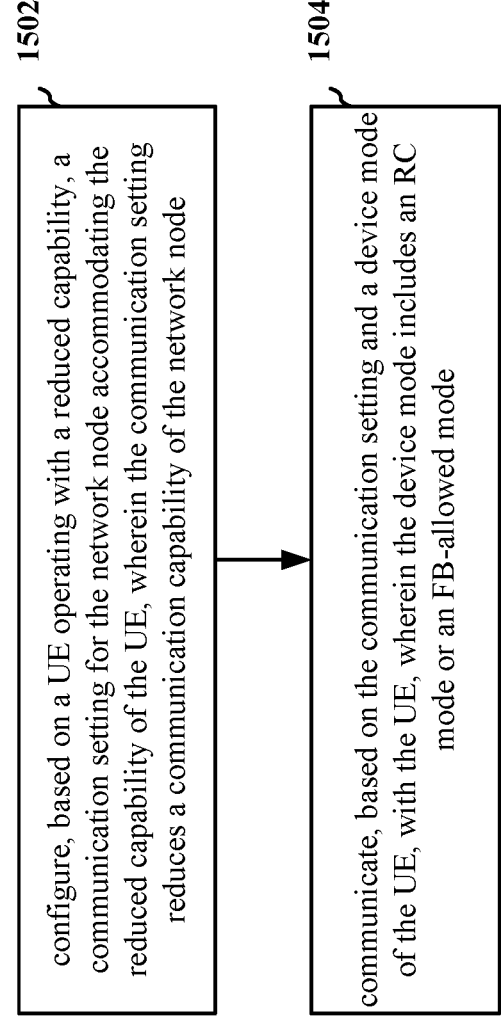

1502 configure, based on a UE operating with a reduced capability, a communication setting for the network node accommodating the reduced capability of the UE, wherein the communication setting reduces a communication capability of the network node

1504 communicate, based on the communication setting and a device mode of the UE, with the UE, wherein the device mode includes an RC mode or an FB-allowed mode

REDCAP UE FALLBACK

CROSS REFERENCE TO RELATED APPLICATION(S)

This application is a continuation-in-part of U.S. application Ser. No. 18/353,533, entitled "REDCAP UE FALLBACK" and filed on Jul. 17, 2023, which is expressly incorporated by reference herein in its entirety.

TECHNICAL FIELD

The present disclosure relates generally to communication systems, and more particularly, to reduced-capability (RedCap) user equipment (UE) fallback methods in wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include at least one memory and at least one processor coupled to the at least one memory. Based at least in part on information stored in the at least one memory, the at least one processor, individually or in any combination, may be configured to identify, based on the support of a cell for the UE operating with reduced capability, the cell type of the cell. The cell type may be one of a reduced-capability (RC) type, a fallback (FB) type, or a neither (N) type. The RC type may indicate a full support for the UE operating with the reduced capability, the FB type may indicate a compatible support for the UE operating with the reduced capability and support for establishing a connection with the UE operating with the reduced capability, and the N type may indicate the lack of support for the UE operating with the reduced capability and a lack of support for establishing a connection with the UE operating with the reduced capability. The at least one processor, individually or in any combination, may be further configured to manage, based on the cell type, a connection between the UE and the cell.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a diagram illustrating a RedCap UE fallback method in accordance with various aspects of the present disclosure.

FIG. 7 is a diagram illustrating example state machines and UE actions of the backoff mechanism in accordance with various aspects of the present disclosure.

FIG. 10 is a flowchart illustrating methods of wireless communication at a UE in accordance with various aspects of the present disclosure.

FIG. 11 is a flowchart illustrating methods of wireless communication at a network node in accordance with various aspects of the present disclosure.

FIG. 12 is a flowchart illustrating methods of wireless communication at a network node in accordance with various aspects of the present disclosure.

FIG. 13 is a diagram illustrating an example of state switching in the fallback (FB)-allowed mode in accordance with various aspects of the present disclosure.

FIG. 14 a flowchart illustrating methods of wireless communication at a UE in accordance with various aspects of the present disclosure.

FIG. 15 a flowchart illustrating methods of wireless communication at a network node in accordance with various aspects of the present disclosure.

DETAILED DESCRIPTION

Figure 1:
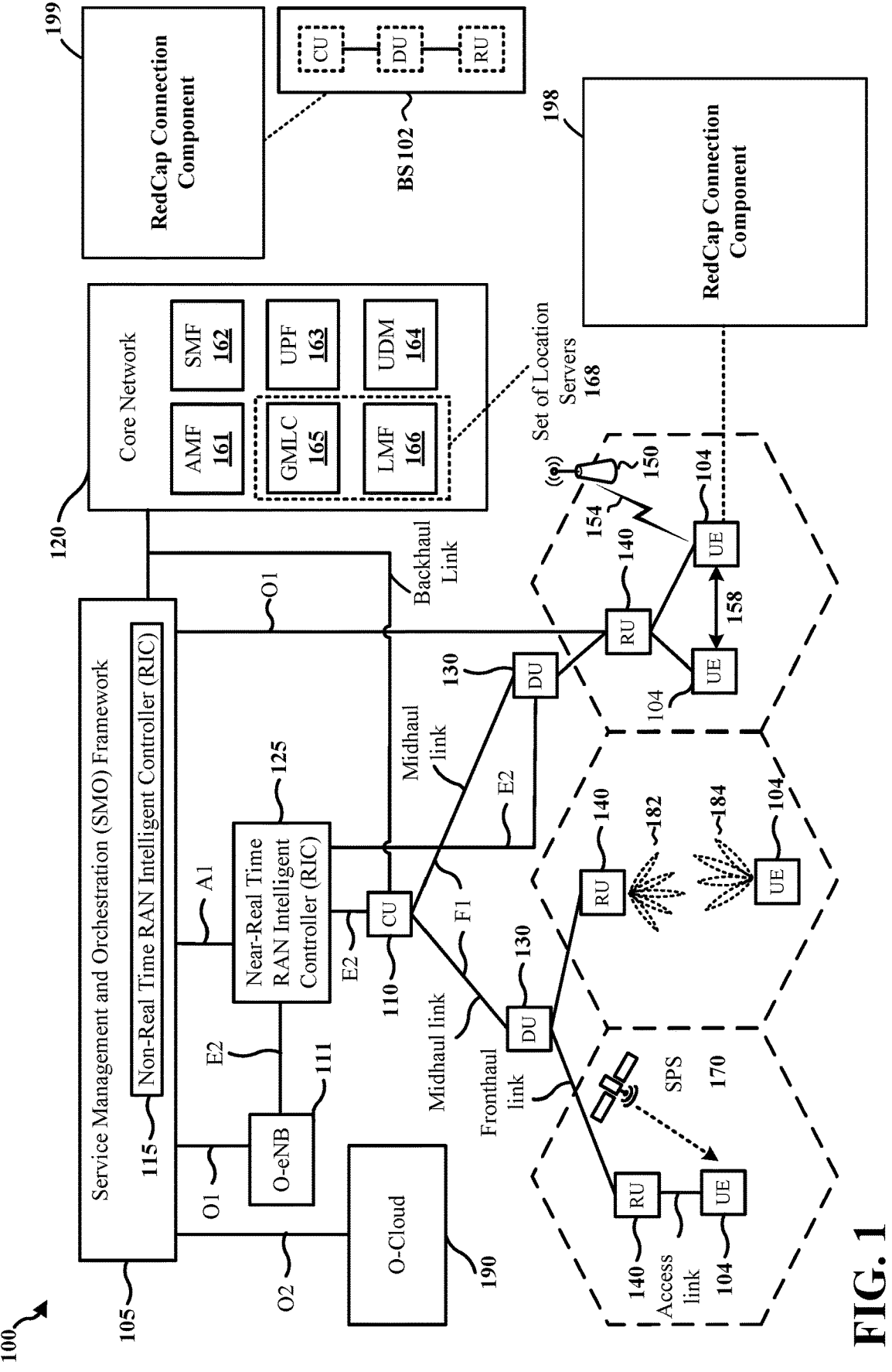
FIG. 1 is a diagram illustrating an example of a wireless communication system and an access network.

A UE may operate with reduced capability (RedCap or RC) to support lower-cost devices such as wearables, watches, and the like. For example, some RedCap UEs may support a bandwidth of 20 MHz (instead of 100 MHz) to reduce cost and complexity. However, not all network node may support RedCap UEs. For example, some network nodes may support 100 MHz bandwidth in time division duplex (TDD) band, but not 20 MHz bandwidth. This may lead to connection failures and service delays when a RedCap UE attempts to connect to these network nodes. Example aspects presented herein provide a solution that allows RedCap UEs to intelligently connect with the network nodes based on the network nodes' support to RedCap UE (herein referred to as the RedCap UE fallback method), without causing any failure in the connection setup process.

Various aspects relate generally to communication systems. Some aspects more specifically relate to RedCap UE fallback methods in wireless communication. In some examples, a UE may identify, based on the support of a cell for the UE operating with reduced capability, the cell type of the cell. The cell type may be one of the RC type, the FB type, or the N type. The RC type may indicate a full support for the UE operating with the reduced capability, the FB type may indicate a compatible support for the UE operating with the reduced capability and support for establishing a connection with the UE operating with reduced capability, and the N type may indicate the lack of support for the UE operating with the reduced capability and a lack of support for establishing connection with the UE operating with reduced capability. The UE may further manage, based on the cell type, a connection between the UE and the cell. In some aspects, the UE may access a network capability database (DB) storing cell information of a plurality of cells, and identify the cell type of the cell based on the network capability DB. In some aspects, the UE may implement a backoff mechanism for the network capability DB.

Particular aspects of the subject matter described in this disclosure can be implemented to realize one or more of the following potential advantages. In some examples, by identifying whether a cell (e.g., an NR cell) or frequency is the RC type, the FB type, or the N type, the described techniques enables the UE to better interact with different network cells and ensure that RedCap UEs may effectively interact with the network nodes, even if some network nodes are not capable of supporting RedCap features. In some examples, by using a network capability DB to record the capability information of each cell, the described techniques allow UEs to quickly identify suitable cells for connection. In some examples, by adopting a backoff mechanism to prevent UEs from accessing certain type of cells (e.g., the N type cells), on, for example, the cell level, the frequency level, or the band level, the described technique reduces unnecessary connection attempts to unsuitable cells, thus improving the overall efficiency of wireless communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE- PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a RedCap connection component 198. The RedCap connection component 198 may be configured to identify, based on the support of a cell for the UE operating with reduced capability, a cell type of the cell. The cell type may be one of the RC type, the FB type, or the N type. The RC type may indicate a full support for the UE operating with the reduced capability, the FB type may indicate a compatible support for the UE operating with the reduced capability and support for establishing a connection with the UE operating with the reduced capability, and the N type may indicate the lack of support for the UE operating with the reduced capability and a lack of support for establishing a connection with the UE operating with the reduced capability. The RedCap connection component 198 may be further configured to manage, based on the cell type, a connection between the UE and the cell. In certain aspects, the base station 102 may include a RedCap connection component 199. The RedCap connection component 199 may be configured to configure, based on a UE operating with reduced capability, a communication setting for the network node accommodating the reduced capability of the UE. The communication setting may reduce a communication capability of the network node. The RedCap connection component 199 may be further configured to communicate with the UE based on the communication setting. Although the following description may be focused on 5G NR, the concepts described herein may be applicable to other similar areas, such as LTE, LTE-A, CDMA, GSM, and other wireless technologies.

Figures 2A, 2B, 2C, 2D:
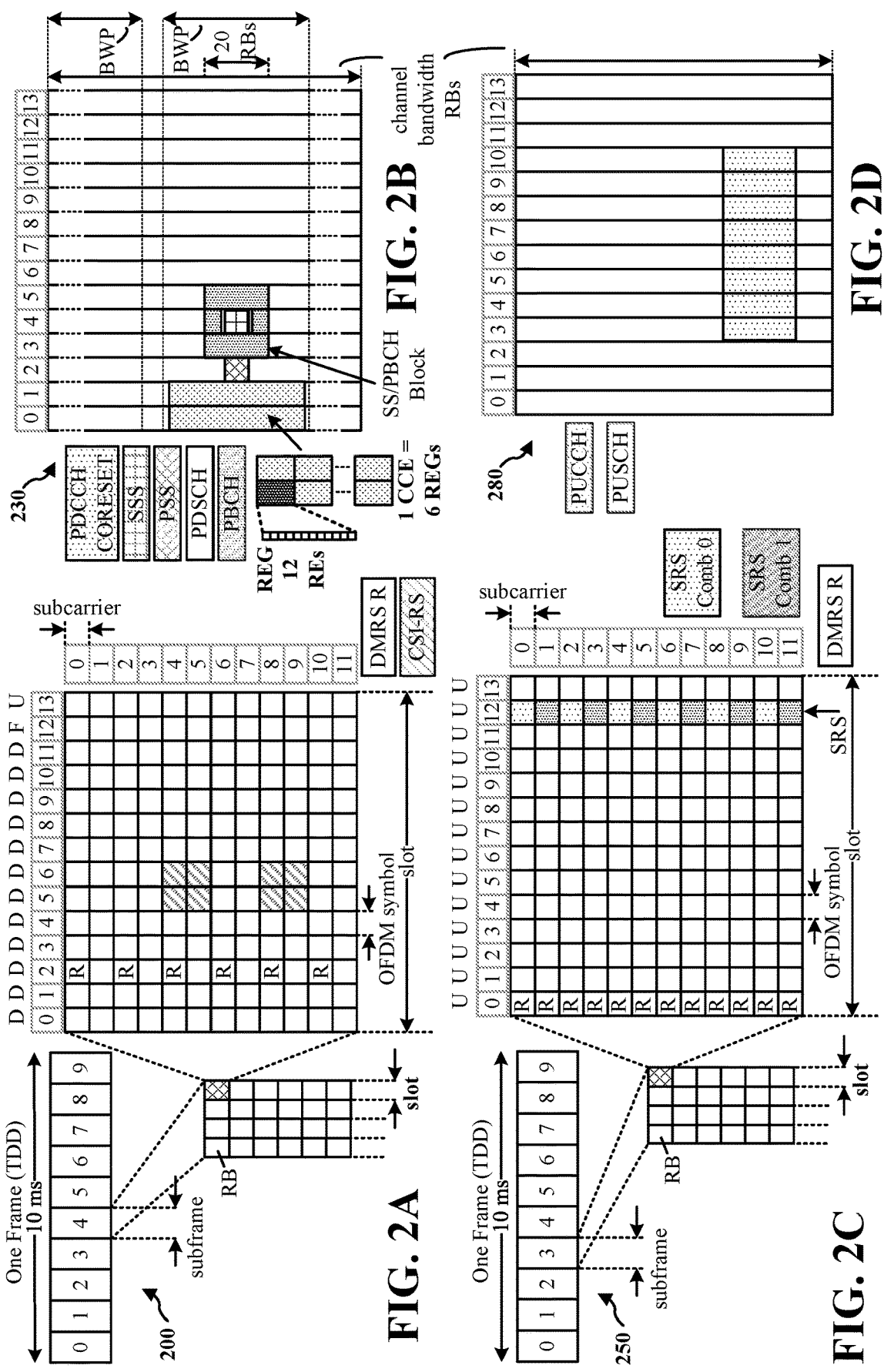
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| $\mu$ | SCS<br>$\Delta f = 2^\mu \cdot 15$ [kHz] | Cyclic prefix |
| 0 | 15 | Normal |
| 1 | 30 | Normal |
| 2 | 60 | Normal,<br>Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB)

(also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
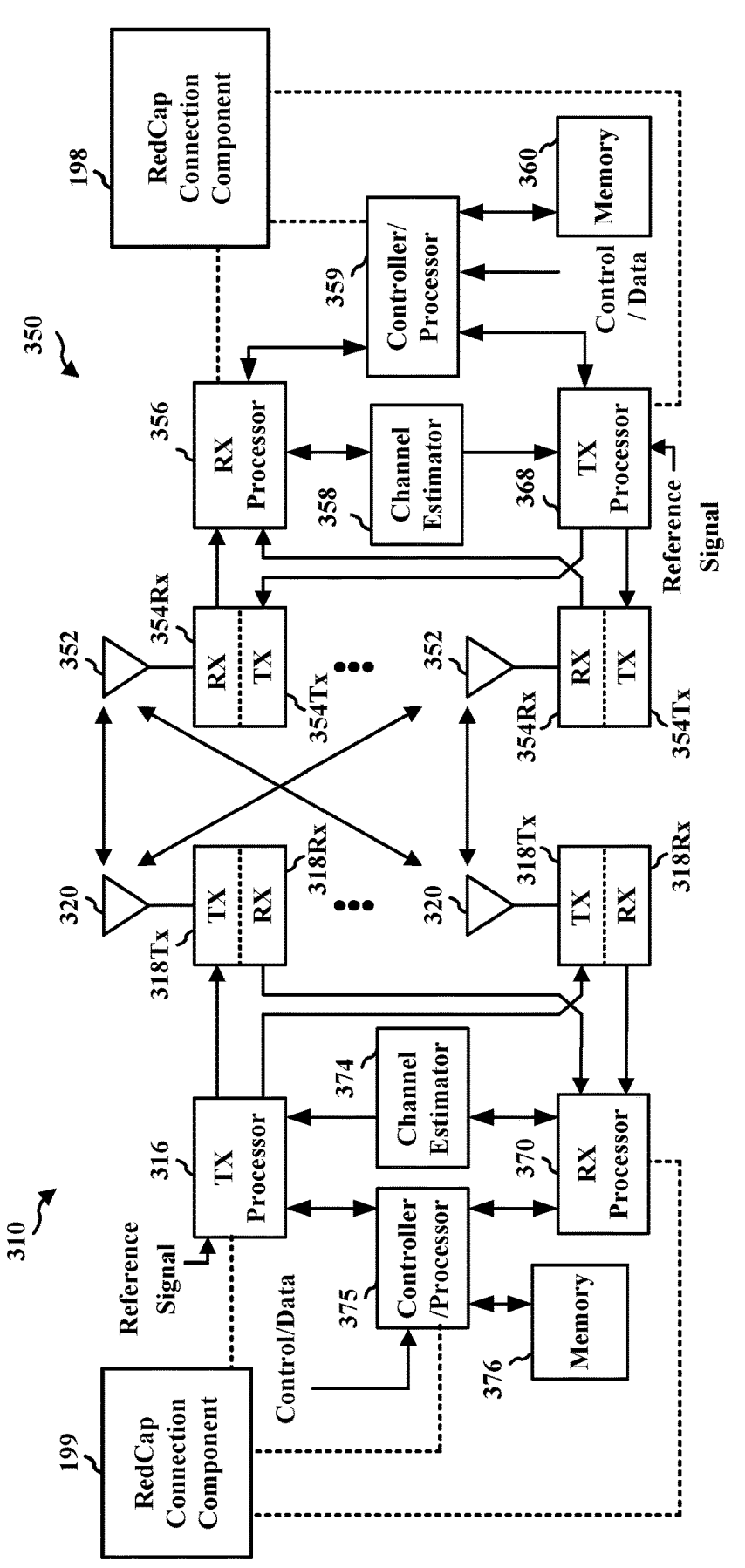
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the RedCap connection component 198 of FIG. 1.

At least one of the TX processor 316, the RX processor 370, and the controller/processor 375 may be configured to perform aspects in connection with the RedCap connection component 199 of FIG. 1.

Example aspects presented herein provide a solution that allows RedCap UE to intelligently select an NR cell that can support the RedCap UE without causing any failure in connection setup. Furthermore, this solution can reduce delay in getting service in redirection, handover (HO), radio link failure (RLF)/out-of-service (OOS) recovery and power up.

In wireless communication, a UE may support reduced capability (RedCap or RC), a feature beneficial to lower-cost devices such as wearables, watches, and the like. For example, a base station (e.g., gNB) may broadcast a redCap-ConfigCommon message in System Information Block type 1 (SIB1) to show its support for RedCap UE. One characteristic of RedCap UE is its ability to support bandwidths up to a bandwidth threshold, such as 20 MHz, thereby eschewing larger bandwidths and carrier aggregation, which may reduce cost. A RedCap UE may camp on a Long Term Evolution evolved Node B (LTE eNB) without any issues, as it can support bandwidths of up to the bandwidth threshold (e.g., 20 MHz). As used herein, a UE can "camp" on a cell may mean the UE can connect to the cell and be in standby mode in the cell. When a UE "camps" on a cell, the UE may not actively engage in wireless transmissions but may be prepared to initiate or receive one.

Figure 4:
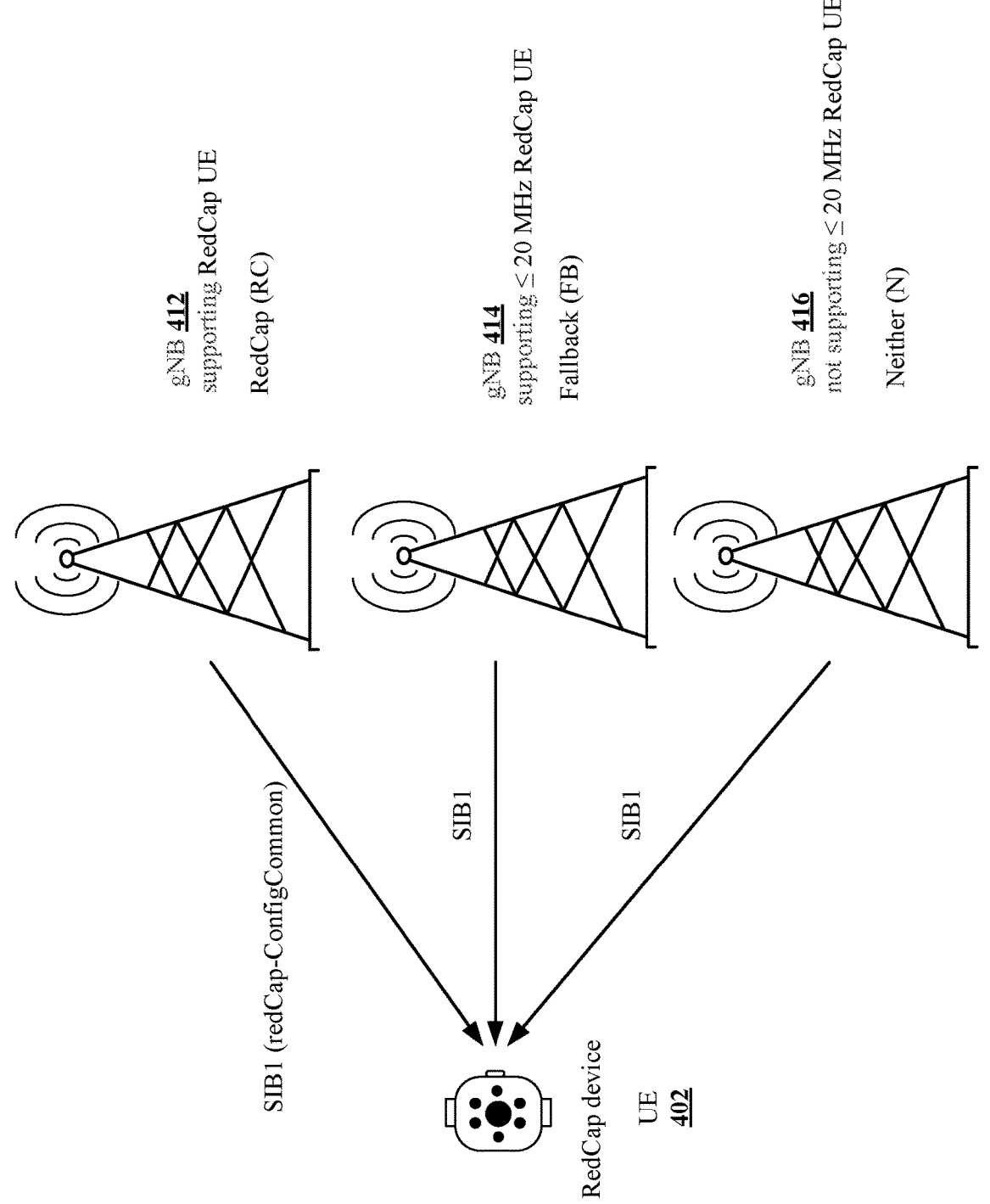
FIG. 4 is a diagram illustrating example cells with various types of supports for RedCap UEs.

In the example aspects presented herein, several terminologies have been established to describe the capabilities of different types of cells (e.g., NR cells) or frequencies. The term RedCap, when used to describe a cell, may refer to the NR cell or frequency that is capable of supporting the RedCap features. The term fallback (FB), when used to describe a cell, may refer to the NR cell or frequency that do not support the RedCap features but can support bandwidths of less than a bandwidth threshold (e.g., 20 MHz, which may be the bandwidth threshold under which a RedCap UE may operate), as may be represented by a dedicated bandwidth part (BWP), an initial bandwidth part, or alike. This functionality enables the FB cell to allow access by RedCap UEs. The term neither (N), when used to describe a cell, may refer to the NR cell or frequency that neither supports the RedCap features nor allows the bandwidths of less than the bandwidth threshold (e.g., 20 MHz). Therefore, N-type cells may not allow RedCap UEs to establish a connection. As used herein, the term "cell" may refer to a network entity or a network node (e.g., a base station) that is capable of transmitting and receiving signals to and from a UE. FIG. 4 is a diagram 400 illustrating example cells with various types of support for RedCap UEs. In FIG. 4, the UE 402 may be a RedCap device. The network nodes (e.g., gNBs) for the UE 402 may be categorized into three types, depending on their support of the RedCap features. The first category is the RedCap (or RC) type network node (e.g., gNB 412), which supports the RedCap feature of the UE 402. The second category is the fallback (FB) type network node (e.g., gNB 414), which may not support the RedCap feature, but support a bandwidth of less than a bandwidth threshold (e.g., 20 MHz), hence allowing access by the UE 402. The third category is the N type network node (e.g., gNB 416), which may not support the RedCap feature or a bandwidth of less than a bandwidth threshold, hence not allowing access by the UE 402.

Not all generation network nodes (e.g., gNB) may support devices with bandwidths less than the bandwidth threshold (e.g., 20 MHz). For example, certain gNBs may support a 100 MHz bandwidth in time division duplex (TDD) bands (e.g., n41). In the scenarios where a UE camps on such an NR cell, the connection setup may likely be dropped. This may result in a substantial increase in call failure rates and significant delays in service access, which may adversely impact user experience and overall network performance. Therefore, a solution in the UE to circumvent the issue of connecting to a network node (e.g., a gNB) that is not equipped to support RedCap UEs may be beneficial.

Example aspects presented herein provide a solution, referred to as the RedCap UE fallback method, for facilitating better compatibility between RedCap UEs and network nodes that may not have been upgraded to support the RedCap features. FIG. 5 is a diagram 500 illustrating a RedCap UE fallback method in accordance with various aspects of the present disclosure. As shown in FIG. 5, the principal components of the method may include a learning procedure 510 and an optimization in mobility procedure 520.

The learning procedure 510 of the method may involve a determination procedure 512, during which the cell (which may be an NR cell or a Long-Term Evolution (LTE) cell) or frequency may be determined to belong to one of three types: the RC type, the FB type, or the N type. This categorization may be based on the respective capabilities and compatibilities of the cell or frequency, and the determination may be performed on various levels, such as a per serving cell level or per neighbor cells/frequencies level. For an NR cell, the determination of the cell type may be accomplished using signature-based assessments of both the serving cell and the neighboring cell. For an LTE cell, the determination of the cell type may be based on the results of an LTE to NR background public land mobile network (BPLMN) search, the mobility of the LTE to the NR cell, or the existing NR DB.

Additionally, a network capability DB 514 may be provided to facilitate the determination of the cell type or frequency. The network capability DB 514 may store details about the network's capabilities, including the classification of each cell (e.g., as RC type, FB type, or N type) and the associated frequency list. The network capability DB 514 may include an NR DB storing information of NR cells and an LTE DB storing information of LTE cells. The NR DB may store, for each NR cell global identity (CGI), the cell type and the associated RC, FB, and NR frequencies. Similarly, the LTE DB may store, for each LTE CGI, the cell type and the associated RC, FB, and NR frequencies.

The learning procedure 510 may further incorporate a fast determination feature 516, which leverages the data available in the network capability DB 514 to facilitate the determination of the suitable NR cell or frequency to use.

The fast determination feature 516 may expedite the process of determining appropriate bands or frequencies. In some examples, bands or frequencies with a bandwidth equal to or less than a bandwidth threshold (e.g., 20 MHz) may be provisioned, a priori, to the UE. In some examples, an LTE-NR neighbor graph may be constructed (e.g., by the UE) and utilized to determine the LTE CGI cell type from the NR CGI cell type. Furthermore, in the fast determination feature 516, crowdsourcing may be used to enable UEs to share DB information among themselves to improve overall network efficiency and performance.

The learning procedure 510 may further include a backoff mechanism 518. The backoff mechanism may throttle (i.e., limit) access to the cells, at, for example, the cell level or the band level, according to their cell types. For example, at the cell-level backoff, if a CGI is classified as the N type, the cell may be excluded from access for a predetermined period (e.g., T1 timer). If there are too many cells of the same NR band in the cell-level backoff, the cell-level backoff may be elevated to a band-level backoff, effectively removing the band from the UE radio capability. In some aspects, the backoff mechanism may include other levels of backoff in addition to the cell and band levels backoff. For example, the backoff mechanism may further include the frequency-level backoff and the tracking area level backoff. The frequency-level backoff may limit the access to one or more cells operating at a certain frequency, and the tracking area level backoff may limit the access to one or more cells operating at a certain tracking area. Table 2 summarizes various example procedures or components of the learning procedure in accordance with various aspects of the present disclosure.

The optimization in mobility procedure 520 may integrate learning mechanisms to manage the mobility operations for the RedCap UE. The mobility operations may include operations related to, for example, reselection/Idle Radio Resource Management (RRM), redirection/Handover (HO)/ Connected RRM, and RLF/OOS Recovery/Power up processes.

TABLE 2

| Various procedures or components of the learning procedure | |
|---|---|
| procedures/ components | Descriptions |
| determination | Determine an NR cell type = RC, FB, or N, using signatures for a serving cell and neighbor cell Determine an LTE cell type = RC, FB, or N, using (i) LTE to NR BPMN search, (ii) mobility of LTE to NR cell, and (iii) NR DB |
| network capability database | NR DB: For each NR CGI, store (i) cell type, and (ii) associated RC, FB, and NR frequencies = "N" LTE DB: For each LTE CGI, store (i) cell type, and (ii) associated RC, FB, and NR frequencies = "N" |
| two-stage backoff | Cell-Level Backoff: If a CGI = "N," then it is in backoff, i.e., exclude this cell for T1 timer from access. Band-Level Backoff: If there are too many cells of the same NR band in "cell-level backoff," then elevate to Band-Level Backoff (remove the band from UE radio capability). |
| Fast determination | Provisioning: Bands/Freqs with ≤20 MHz bandwidth are provisioned a priori to the UE. Neighbor graph: Use LTE-NR neighbor graph to determine LTE CGI cell type from NR CGI cell type, and/or based on 1-hop/2-hop neighbor status. Crowdsourcing to share DB among UEs. |

In some aspects, if the cell is an NR cell, the UE may determine the cell type as the RC type by reading a system information block type 1 (SIB1) containing the redCap-ConfigCommon information element (IE).

In some aspects, for the NR cells that do not broadcast the redCap-ConfigCommon IE in SIB1, the UE may determine the NR cells as the N type cells if any of a set of signature conditions is present. In some aspects, the set of signature conditions may include: (1) the initial bandwidth part (BWP) in SIB1 exceeds the bandwidth threshold (e.g., 20 MHz); (2) an RRCSetup fails due to invalid BWP or channel Bandwidth (BW) configuration, such as exceeding 20 MHz; (3) an RRCRelease is received instead of an RRCRecon-figuration, which indicates the network's inability to support RedCap UE; (4) the reception of RRCReconfiguration/RRCResume with channel BW exceeding 20 MHz and all BWP bandwidths over 20 MHz, suggesting that the network supports bandwidths greater than 20 MHz even though the initial BWP was 20 MHz or less; (5) a Handover (HO) (RRCReconfigurationWithSync) to a cell with an incorrect BWP/channel BW, such as more than 20 MHz; or (6) a post-radio link failure (RLF) re-establishment failure for reasons similar to those described above. Table 3 summa-rizes some examples of the signature conditions. If none of the above-mentioned signatures are identified, thereby indi-cating that a RedCap UE may establish a connection with the cells, the NR cell type may be classified as the FB type.

TABLE 3

Example of the signature conditions
for determining the N type cells

| No. | Signature conditions for N type NR cell |
| --- | --- |
| 1 | initial BWP >20 MHz in SIB1 |
| 2 | RRCSetup failed due to invalid BWP or channel BW configuration, e.g., >20 MHz |
| 3 | RRCRelease is received, instead of RRCReconfiguration (due to NW unable to support redCap UE) |
| 4 | RRCReconfiguration/RRCResume received with: Channel BW >20 MHz (e.g., NW supports >20 MHz although initial BWP ≤20 MHz) AND all BWP BWs is >20 MHz |
| 5 | HO (RRCReconfiguration WithSync) to a cell with incorrect BWP/CBW, e.g., >20 MHz |
| 6 | Post RLF Re-establishment Failure for similar reasons |

Referring to Table 2, the NR DB (which may also be referred to as "NR capability DB") may store the cell type (e.g., the RC type, the FB type, the N type, or UNKNOWN) of a specific NR Cell Global Identifier (NR-CGI) along with its serving frequency. Moreover, the NR capability DB may maintain records of neighboring NR frequencies, acquired either via the system information block type 4 (SIB4) or mobility procedures. Table 4 shows the example contents of the NR DB.

TABLE 4

Example contents of the NR DB

| NR-CGI | Type | Serving Frequency | Examples in neighbor NR frequencies |
| --- | --- | --- | --- |
| C1 | RC | afcn1 | Neighbor-RC-Freqs = {afcn11, afcn12} or { } Neighbor-FB-Freqs = {afcn13, afcn14} or { } Neighbor-N-Freqs = {afcn 15} or { } |
| C2 | FB | afcn2 | Neighbor-RC-Freqs = {afcn21, afcn22} or { } Neighbor-FB-Freqs = {afcn23 } or { } Neighbor-N-Freqs = {afcn24, afcn25} or { } |
| C3 | N | afcn3 | Neighbor-N-Freqs = {afcn33, afcn34} or { } |
| C4 | UNKNOWN | afcn4 | |

As shown in Table 4, the neighbor NR frequencies may be classified as "Neighbor-RC-Freqs," "Neighbor-FB-Freqs," or "Neighbor-N-Freqs." The determination of neighbor NR frequency classification may be based on the following procedures. First, "Neighbor-RC-Freqs" are those frequen-cies in SIB4 with the attribute "redcapAccessAllowed" set to true, or ascertained via search and mobility processes (such as reselection, redirection, or handover) with at least one cell's SIB1 indicating RC support. Second, "Neighbor-FB-Freqs" are those frequencies that do not indicate "redcapAccessAllowed=true" in SIB4, but are identified via mobility to some cells of the frequency that indicates FB support. Third, "Neighbor-N-Freqs" are frequencies that neither indicate "redcapAccessAllowed=true" in SIB4 nor support NR and FB, as indicated through mobility to all cells of this frequency. In this disclosure, the term "frequency" may be abbreviated as "freq" or "freqs." Table 5 shows the determination process of the neighbor NR frequencies for NR cells.

TABLE 5

The determination process of the neighbor
NR frequencies for NR cells

| Frequencies | Conditions |
| --- | --- |
| "Neighbor-RC-Freqs" | Freq in SIB4 has "redcap AccessAllowed = true"; OR Via search, mobility (reselection, redirection, HO) and at least one cell with SIB1 indicating RC supported |
| "Neighbor-FB-Freqs" | SIB4 freq does not indicate "redcapAccessAllowed = true"; AND Via mobility to some cell of the freq indicating FB supported. |
| "Neighbor-N-Freqs" | SIB4 freq does not indicate "redcapAccessAllowed = true"; AND Via mobility to all cells of this freq indicating NR and FB not supported. |

Referring to Table 2, to determine the LTE cell type (or LTE CGI type) and associated NR frequencies, the deter-mination may be accomplished in two ways: through a periodic LTE to NR BPLMN search, or via LTE to NR reselection, redirection, or HO operations to identify an NR CGI.

For LTE cells, the determination of neighboring NR frequencies, classified as "Neighbor-RC-Freq," "Neighbor-FB-Freq," or "Neighbor-N-Freqs," may be accomplished based on the following procedures. First, "Neighbor-RC- Freqs" are those neighboring NR frequencies that support the RedCap features, as indicated in the SIB1 through search and mobility procedures or when the NR DB confirms that some NR neighbor or NR cell type is the RC type. "Neighbor-FB-Freqs" are frequencies that do not support RC, as indicated in SIB1 via search and mobility procedures, and are shown to support Fallback (FB) via search, mobility, or the NR DB confirmation that some NR neighbors are the FB type. Third, "Neighbor-N-Freqs" are frequencies that are neither RC nor FB supported, as indicated via search and mobility procedures, or when the NR DB confirms that all neighboring cells are the N type. Table 6 shows the determination process of the neighbor NR frequencies for LTE cells.

TABLE 6

The determination process of the neighbor
NR frequencies for LTE cells

| Frequencies | Conditions |
| --- | --- |
| "Neighbor-RC-Freqs" | Neighbor NR freq has cell indicating RC supported in SIB1 via search, mobility; OR NR DB some NR neighbor or NR cell type = RC |
| "Neighbor-FB-Freqs" | Neighbor NR freq does not have any cell of RC supported in SIB1 via search, mobility; AND Some cell of the freq indicating FB supported via search, mobility; OR NR DB shows some NR neighbor = FB. |
| "Neighbor-N-Freqs" | Via search, mobility shows freq is not RC/FB supported; OR NR DB shows all neighbor cells = Neither |

Figure 6:
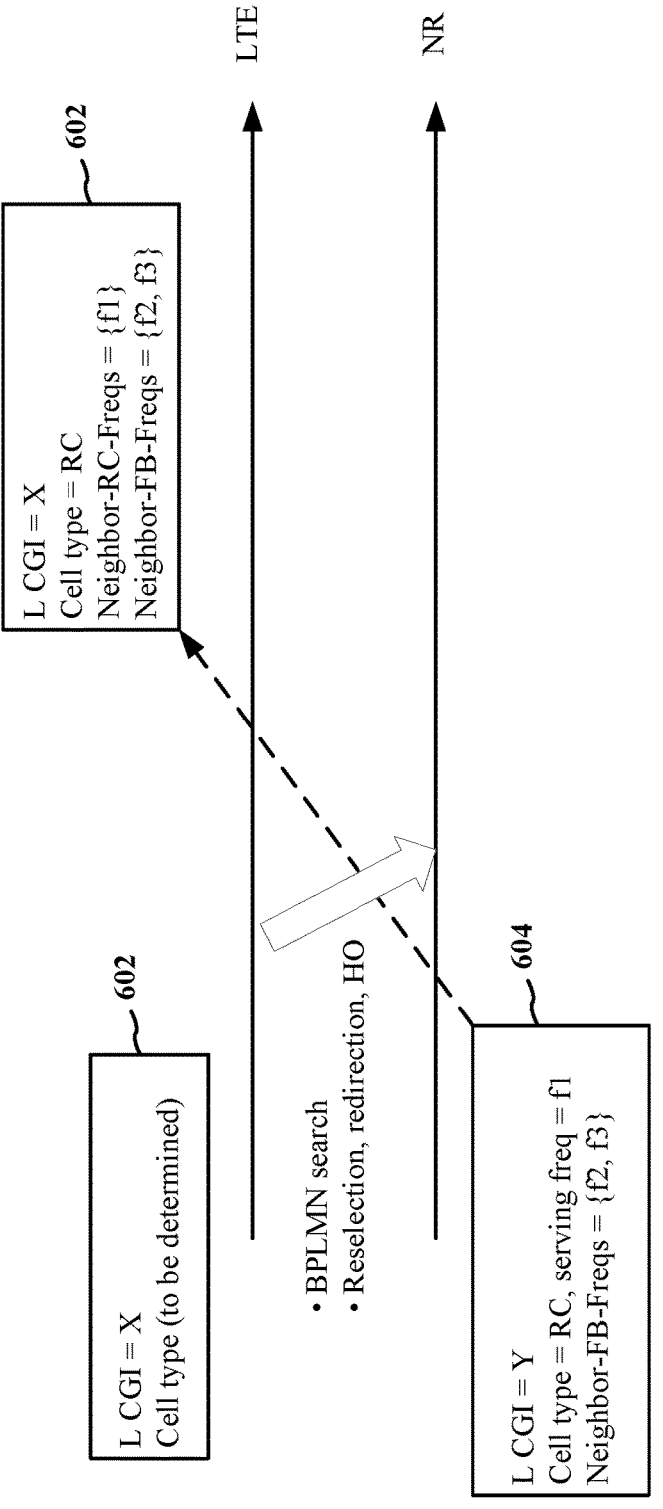
FIG. 6 is a diagram illustrating an example of determining the cell type of an LTE cell in accordance with various aspects of the present disclosure.

FIG. 6 is a diagram 600 illustrating an example of determining the cell type of an LTE cell 602. In FIG. 6, the NR DB shows that a neighbor NR cell 604 has a cell type of RC type. This cell type identification is corroborated by the presence of a specific signature, which confirms the cell as the RC type. This signature manifests itself either through the broadcasting of SIB1, which indicates the support for the RedCap features, or through the ability to set up a connection.

Aspects of the present disclosure include an implementation of a Long-Term Evolution (LTE) Network Capability Database (DB), designed to store important network parameters. In particular, this database retains the type information of an LTE Cell Global Identifier (CGI), categorizing each as either RedCap (RC), fallback (FB), neither (N), or Unknown. Moreover, the LTE network capability DB preserves data concerning the neighbor frequencies associated with each LTE CGI.

Referring to Table 2, the LTE DB (which may also be referred to as "LTE network capability DB") may store the cell type (e.g., the RC type, the FB type, the N type, or UNKNOWN) of a specific LTE Cell Global Identifier (LTE-CGI) along with its neighbor frequency. Table 7 shows the example contents of the LTE DB.

TABLE 7

Example contents of the LTE DB

| LTE-CGI | Type | Serving Frequency | Neighbor NR Frequencies |
| --- | --- | --- | --- |
| C5 | RC | afcn5 | Neighbor-RC-Freqs = {afcn51, afcn52} Neighbor-FB-Freqs = {afcn53} or { } Neither-Freqs = {afcn54} or { } |

TABLE 7-continued

Example contents of the LTE DB

| LTE-CGI | Type | Serving Frequency | Neighbor NR Frequencies |
| --- | --- | --- | --- |
| C6 | FB | afcn6 | Neighbor-RC-Freqs = { } Neighbor-FB-Freqs = {afcn61} Neighbor-N-Freqs = {afcn62} or { } |
| C7 | N | afcn7 | Neither-N-Freqs = {afcn71} |
| C8 | UNKNOWN | afcn8 | |

Referring to Table 2, the example two-stage backoff technique is a procedure to throttle access to a cell or band to avoid a RedCap UE cannot get service in the cell or frequency that does not support the RedCap features. The two-stage backoff mechanism (cell/CGI level and band level) can be applicable to the network capability DB, enabling the elevation of backoff to a band level when there is a significant number of NR cells within that band in cell-level backoff. Additionally, the backoff mechanism may not be limited to the two-stage backoff. In some examples, multiple-stage backoff (e.g., three-stage backoff or four-stage backoff) may be implemented to limited the access to one or more cells to prevent the UE from attempting to establish a connection to cells that may not support the RedCap features.

FIG. 7 is a diagram 700 illustrating example state machines and UE actions of the backoff mechanism in accordance with various aspects of the present disclosure. In FIG. 7, a cell may initially be at a "no backoff" state 710, and a UE may perform normal mobility procedures on that cell. If it is determined, at 702, that the cell does not support RedCap or FB, an NR CGI cell-level backoff 720 may apply, which may throttle mobility/access to the CGI. The NR CGI cell-level backoff 720 may be valid for the first period of time $T_1$, and the cell may return, at 704, to the "no backoff" state 710 after the first period of time $T_1$. At 706, if a significant number of cells on a band are in CGI backoff, NR band-level backoff 730 may apply, and the band may be removed from UE capability for a certain period of time (e.g., $X_2$ minutes). The NR band-level backoff 730 may be valid for the second period of time $T_2$, and the cell may return, at 708, to the cell-level backoff 720 after the second period of time $T_2$. Table 8 shows examples of state machines and the UE actions for the backoff mechanism.

TABLE 8

Examples state machines and the UE
actions for the backoff mechanism.

| State | Enter condition | UE action in this state |
| --- | --- | --- |
| No Backoff | Enter from CGI/ Level 1 Backoff: Upon T1 expiry | Perform normal mobility procedures |
| NR CGI (level 1) Backoff | Enter from No Backoff This NR cell does not support RC or FB Enter from No Band/Level 2 Backoff Upon T2 expiry | Throttle access to these NR cells |

TABLE 8-continued

| Examples state machines and the UE actions for the backoff mechanism. | | |
|---|---|---|
| State | Enter condition | UE action in this state |
| NR Band (level 2) Backoff | Enter from Cell/ Level 1 Backoff At least K cells on the same band are in CGI/Level 1 Backoff | Remove the NR band from UE capability for X2 minutes |

Referring to Table 2, the fast determination (or fast learning) process may allow a UE to speed up the learning of the neighborhood. The fast determination process may include several approaches. In some examples, a provisioning strategy may be used, whereby bands and frequencies characterized by a bandwidth configuration of, for example, 20 MHz or less are provisioned to the UE as priori information. In some examples, the UE may use a neighbor graph approach to expedite learning. For example, if a neighbor cell relationship is already established from LTE CGI to NR CGI within the neighbor graph, the network capability DB related to LTE CGI may be copied from the corresponding NR CGI network capability DB. In some examples, the UE may leverage crowdsourcing to further facilitate fast learning. For example, the UE may upload its network capability DB to a crowdsourcing server, which then aggregates DBs from multiple UEs, thereby consolidating a larger body of network knowledge, and a UE may then retrieve the consolidated database from the server. Table 9 shows examples of faster learning approaches.

TABLE 9

| Examples fast learning approaches | | |
|---|---|---|
| No | Approach | Description of approach |
| 1 | Provisioning | Bands/Freqs with ≤20 MHz bandwidth configuration are provisioned a priori to the UE. |
| 2 | Neighbor graph | If a neighbor cell is already known from L CGI to NR CGI in neighbor graph, the L CGI network capability DB can be copied from NR CGI network capability DB. Similarly, for any UNKNOWN cells: carry over the info of a p reviously camped cell that is in the same neighborhood (e.g., 1 or 2 hops away) from network capability DB to this UNKNOWN cell. |
| 3 | Crowdsourcing | UE can upload DB to crowdsourcing server which can consolidate DBs from multiple UEs. Then a UE can request from server. |

In some aspects, mobility procedures, such as reselection, redirection, connected mode measurements, HO, OOS, RLF recovery, and power-up scans may be optimized through leveraging the network capability DB and the backoff status of the respective cells or bands. As used herein, the term "backoff status" of a cell may refer to the particular backoff level (e.g., no backoff, cell-level backoff, frequency-level backoff, or band-level backoff) the cell is operating with. One goal of these optimized mobility procedures may be to prioritize NR cells classified as the RC type over those classified as the FB type, which are in turn prioritized over frequencies of unknown status. Furthermore, it may be desirable to avoid backoff cells or bands during reselection, redirection, HO, RLF/OOS recovery, and power-up searches. By avoiding such cells or bands, the risk of connectivity issues and network disruptions may be minimized. Table 10 shows example optimizations of various mobility procedures.

TABLE 10

| Example optimizations of mobility procedures | |
|---|---|
| Mobility procedures | Optimization |
| N2N or L2N Reselection | Prioritize camping: RC > FB > Unknown freqs/cell. Prune backoff cell or band. |
| N2N or L2N Redirection | Prioritize scan: RC > FB > Unknown freqs/cell. Prune backoff cell and band. |
| N2N or L2N Connected Mode Measurements | Prioritize measurement on RC > FB > Unknown freqs. Prune backoff cell |
| N2N or L2N Handover | If HO command does send UE to a backoff NR cell, still try connection setup and if there is a failure, use RLF. |
| OOS/RLF/Power scan | Prioritize RC > FB > Unknown freqs. Prune backoff cell and band. |

In some aspects, the RedCap UE fallback method may be applicable to other RedCap abilities other than the reduced bandwidth. In one example, a RedCap UE may support 8 data radio bearers (DRBs), with the option to support 16 DRBs. On the other hand, a Non-RedCap UE may support 16 DRBs by default.

In circumstances where the UE enters the fallback mode, the UE may be configured to support more than 8 DRBs since the network does not recognize the RedCap (8 DRBs) capacity of the UE. In such cases, the UE may take several actions if the network configures more than 8 DRBs. For example, if a UE is configured more than 8 DRBs, it may respond with reconfiguration failure and RLF. If the UE already has 8 DRBs, it may block subsequent new packet data unit (PDU) session setups. However, this method may fail when an additional DRB is configured for an existing PDU session. In some examples, the UE may move to LTE or block the NR cell.

In another example, a RedCap UE may support 12 bits of radio link control/packet data convergence protocol sequence number (RLC/PDCP SN) length, while a non-RedCap UE may support an 18-bit length. The UE may behave in a similar manner as that for the DRB configuration. For example, if the UE is configured with more than 12 bits RLC/PDCP SN length, the UE may respond with reconfiguration failure, or decide to move to LTE or block the NR cell.

While the example aspects presented herein are related to LTE and NR technologies, the concepts and mechanisms are generalizable and may be applied to other generations of technologies than LTE and NR technologies. Similarly, while the example aspects presented herein are primarily aimed at addressing issues for RedCap UE devices, the strategies introduced here, such as learning, database use, backoff mechanism, fast determination, and mobility procedure optimization, are applicable to other types of UE devices than the RedCap UE devices, such as UE devices with differing bandwidth capabilities or connection specifications.

Figure 8:
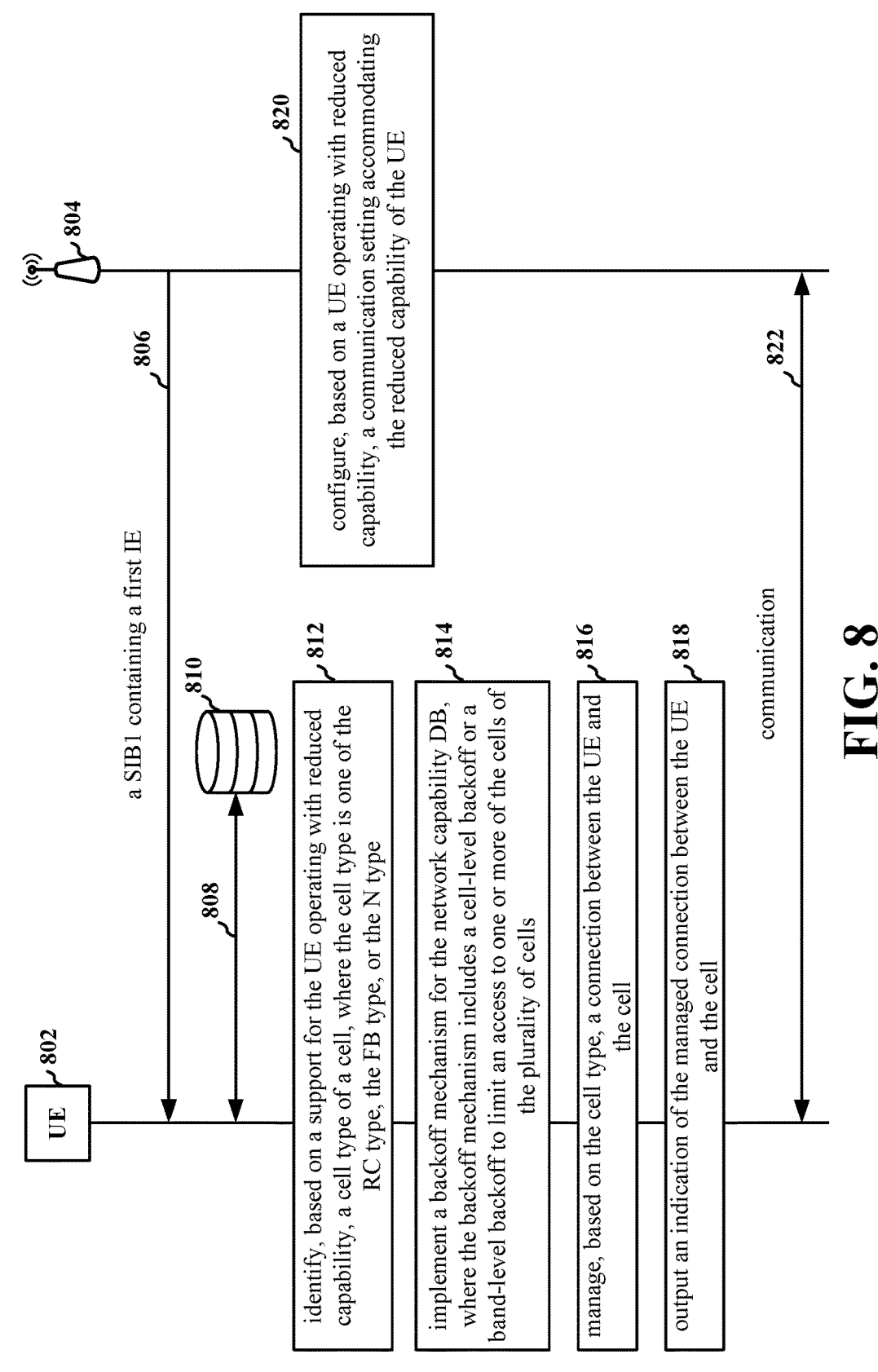
FIG. 8 is a call flow diagram illustrating a method of wireless communication in accordance with various aspects of the present disclosure.

FIG. 8 is a call flow diagram 800 illustrating a method of wireless communication in accordance with various aspects of this present disclosure. Various aspects are described in connection with a UE 802 and a base station 804. The aspects may be performed by the UE 802 or the base station 804 in aggregation and/or by one or more components of a base station 804 (e.g., such as a CU 110, a DU 130, and/or an RU 140).

As shown in FIG. 8, a UE 802 may receive from the base station 804 the system information block type 1 (SIB1) containing a first IE. For example, the first IE may be the redCap-ConfigCommon IE, which may indicate the base station is the RC type. For example, referring to FIG. 4, the UE 402 may receive from the base station (e.g., gNB 412) the SIB1 containing a first IE (e.g., the redCap-ConfigCommon IE).

At 808, the UE 802 may access a network capability DB 810. The network capability DB may store cell information of a plurality of cells (or base stations). The cell information of the plurality of cells (or base stations) may include an associated cell type and an associated frequency for each cell (or base station) of the plurality of cells (or base stations). For example, referring to Table 2, the network capability DB may store cell information of the plurality of cells, and the information may include the cell type (RC, FB, or N) and an associated frequency.

At 812, the UE 802 may identify, based on the support of a cell for the UE operating with reduced capability, a cell type of the cell. The cell type may be one of a reduced capability (RC) type, a fallback (FB) type, or a neither (N) type. The RC type may indicate a full support for the UE operating with the reduced capability, the FB type may indicate a compatible support for the UE operating with the reduced capability and support for establishing a connection with the UE operating with the reduced capability (e.g., support for a bandwidth that is less than or equal to a bandwidth threshold), and the N type may indicate the lack of support for the UE operating with the reduced capability and a lack of support for establishing a connection with the UE operating with the reduced capability (e.g., lack of support for the bandwidth that is less than or equal to the bandwidth threshold). For example, the reduced capability of the UE may include one of the operational frequency bandwidth of the UE limited by a bandwidth threshold, the number of DRB limited by a DRB threshold, or the length of a sequence number used in RLC and PDCP layers limited by a length threshold. As used herein, an RC type cell having a "full support" for the UE operating with the reduced capability means the cell's capability aligns with the reduced capability of the UE. For example, if the reduced capability feature of a UE is that the operational frequency bandwidth of the UE is limited by a bandwidth threshold, an RC type cell may have the capability to operate on the same bandwidth as that limited by the bandwidth threshold. An FB type cell having a "compatible support" for the UE operating with the reduced capability means that the cell's capability may surpass the UE's reduced capability. However, the cell can reduce its capability to accommodate the UE's reduced capability if needed (e.g., for the purpose of connecting with the UE).

At 814, the UE 802 may implement a backoff mechanism for the network capability DB. The backoff mechanism may include various levels of backoff to limit access to one or more of the cells of the plurality of cells in the network capability DB. For example, the levels of backoff may include one or more of a cell-level backoff, a frequency-level backoff, a band-level backoff, or a tracking area level backoff. For example, referring to FIG. 7, the backoff mechanism may include a cell-level backoff 720 and a band-level backoff 730 to limit access to one or more of the cells of the plurality of cells in the network capability DB.

At 816, the UE 802 may manage a connection between the UE and the cell based on the cell type. In some examples, managing the connection may include managing the mobility procedure of the UE. For example, the mobility procedure of the UE may include: an N2N or L2N reselection for selecting a second cell of the plurality of cells for the UE, an N2N or L2N redirection for selecting the second cell for the UE, an N2N or L2N connected mode measurement process for selecting the second cell for the UE, an N2N or L2N handover for selecting the second cell for the UE, an OOS scan for selecting the second cell for the UE, an RLF scan for selecting the second cell for the UE, or a power scan for selecting the second cell for the UE.

At 818, the UE 802 may output an indication of the managed connection between the UE and the cell. In some examples, the UE 802 may transmit the indication of the managed connection between the UE and the cell. In some examples, the UE 802 may store the indication of the managed connection between the UE and the cell.

At 820, the base station 804 may configure, based on the UE 802 operating with reduced capability, a communication setting for the base station 804. The communication setting may accommodate the reduced capability of the UE 802. For example, when the reduced capability of the UE 802 is that the operational frequency bandwidth of the UE 802 is limited by the bandwidth threshold of 20 MHz, the base station 804 may configure up to the UE's capability of 20 MHz bandwidth, even though the base station 804 may be capable of communicating at a bandwidth larger than 20 MHz.

At 822, the base station 804 and the UE 802 may communicate based on the communication setting. For example, when the reduced capability of the UE 802 is that the operational frequency bandwidth of the UE 802 is limited by the bandwidth threshold of 20 MHz, the base station 804 and the UE 802 may communicate at the bandwidth of not more than 20 MHz.

Figure 9:
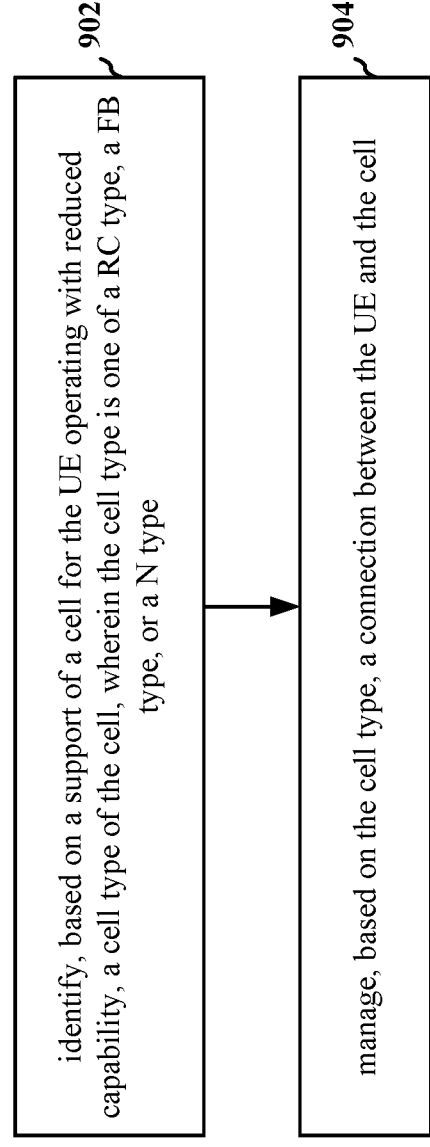
FIG. 9 is a flowchart illustrating methods of wireless communication at a UE in accordance with various aspects of the present disclosure.

FIG. 9 is a flowchart 900 illustrating methods of wireless communication at a UE in accordance with various aspects of the present disclosure. The method may be performed by a UE. The UE may be the UE 104, 350, 802, or the apparatus 1604 in the hardware implementation of FIG. 16. The method provides a comprehensive solution for facilitating better compatibility between RedCap UEs and network nodes that may not have been upgraded to support the RedCap features. It enhances network compatibility, reduces service delays, and improves the overall efficiency of wireless communication.

As shown in FIG. 9, at 902, the UE may identify, based on the support of a cell for the UE operating with reduced capability, a cell type of the cell. The cell type may be one of the RC type, the FB type, or the N type. The RC type may indicate a full support for the UE operating with the reduced capability, the FB type may indicate a compatible support for the UE operating with the reduced capability and support for establishing a connection with the UE operating with the reduced capability (e.g., support for a bandwidth that is less than or equal to a bandwidth threshold), and the N type indicates the lack of support for the UE operating with the reduced capability and a lack of support for establishing a connection with the UE operating with the reduced capability (e.g., lack of support for the bandwidth that is less than or equal to the bandwidth threshold). In some examples, the cell may be a network entity, which may be a base station, or a component of a base station, in the access network of FIG. 1 or a core network component (e.g., base station 102, 310, 804; or the network entity 1602 in the hardware implementation of FIG. 16). FIGS. 4, 5, 6, 7, and 8 illustrate various aspects of the steps in connection with flowchart 900. For example, referring to FIG. 8, the UE 802 may identify, at 812, based on the support of a cell for the UE operating with reduced capability, a cell type of the cell. Referring to FIG. 5, at 512, the UE may determine the cell type (e.g., as the RC type, the FB type, or the N type). In some aspects, 902 may be performed by the RedCap connection component 198.

At 904, the UE may manage a connection between the UE and the cell based on the cell type. For example, referring to FIG. 8, the UE 802 may manage, at 816, a connection between the UE and the cell based on the cell type. Referring to FIG. 5, the UE may manage, at 520, a connection between the UE and the cell (e.g., perform the optimization of the mobility procedure) based on the cell type. In some aspects, 904 may be performed by the RedCap connection component 198.

FIG. 10 is a flowchart 1000 illustrating methods of wireless communication at a UE in accordance with various aspects of the present disclosure. The method may be performed by a UE. The UE may be the UE 104, 350, 802, or the apparatus 1604 in the hardware implementation of FIG. 16. The method provides a comprehensive solution for facilitating better compatibility between RedCap UEs and network nodes that may not have been upgraded to support the RedCap features. It enhances network compatibility, reduces service delays, and improves the overall efficiency of wireless communication.

As shown in FIG. 10, at 1008, the UE may identify, based on the support of a cell for the UE operating with reduced capability, a cell type of the cell. The cell type may be one of the RC type, the FB type, or the N type. The RC type may indicate a full support for the UE operating with the reduced capability, the FB type may indicate a compatible support for the UE operating with the reduced capability and support for establishing a connection with the UE operating with the reduced capability (e.g., support for a bandwidth that is less than or equal to a bandwidth threshold), and the N type indicates the lack of support for the UE operating with the reduced capability and a lack of support for establishing a connection with the UE operating with the reduced capability (e.g., lack of support for the bandwidth that is less than or equal to the bandwidth threshold). In some examples, the cell may be a network entity, which may be a base station, or a component of a base station, in the access network of FIG. 1 or a core network component (e.g., base station 102, 310, 804; or the network entity 1602 in the hardware implementation of FIG. 16). FIGS. 4, 5, 6, 7, and 8 illustrate various aspects of the steps in connection with flowchart 1000. For example, referring to FIG. 8, the UE 802 may identify, at 812, based on the support of a cell for the UE operating with reduced capability, a cell type of the cell. Referring to FIG. 5, at 512, the UE may determine the cell type (e.g., as the RC type, the FB type, or the N type). In some aspects, 1008 may be performed by the RedCap connection component 198.

At 1010, the UE may manage a connection between the UE and the cell based on the cell type. For example, referring to FIG. 8, the UE 802 may manage, at 816, a connection between the UE and the cell based on the cell type. Referring to FIG. 5, the UE may manage, at 520, a connection between the UE and the cell (e.g., perform the optimization of the mobility procedure) based on the cell type. In some aspects, 1010 may be performed by the RedCap connection component 198.

In some aspects, at 1012, the UE may output an indication of the managed connection between the UE and the cell. For example, referring to FIG. 8, the UE 802 may output, at 818, an indication of the managed connection between the UE and the cell. In some aspects, 1012 may be performed by the RedCap connection component 198.

In some aspects, to output the indication of the managed connection between the UE and the cell (at 1012), the UE may transmit the indication of the managed connection between the UE and the cell, or store the indication of the managed connection between the UE and the cell. For example, referring to FIG. 8, to output the indication of the managed connection between the UE and the cell (at 818), the UE 802 may transmit the indication of the managed connection between the UE 802 and the cell (e.g., base station 804), or store the indication of the managed connection between the UE 802 and the cell (e.g., base station 804).

In some aspects, the reduced capability may be an operational frequency bandwidth of the UE limited by the bandwidth threshold. For example, referring to FIG. 8, the reduced capability (at 812) may be an operational frequency bandwidth of the UE limited by the bandwidth threshold.

In some aspects, the bandwidth threshold is 20 MHz. For example, referring to FIG. 8, the bandwidth threshold for the reduced capability (at 812) may be 20 MHz.

In some aspects, to identify the cell type of the cell (at 1008), the UE may identify a set of neighbor NR frequencies associated with the cell. For example, referring to FIG. 8, to identify the cell type of the cell (base station 804), the UE 802 may identify, at 812, a set of neighbor NR frequencies associated with the cell. Referring to FIG. 6, to identify the cell type of the cell 602, the UE 802, the UE may identify a neighbor NR frequency (a neighbor NR cell 604) associated with the cell 602.

In some aspects, the set of neighbor NR frequencies may indicate a neighbor cell is an NR cell, and the set of neighbor NR frequencies may include one or more of: a neighbor RC frequency indicating the cell type of the neighbor cell is the RC type, a neighbor FB frequency indicating the cell type of the neighbor cell is the FB type, or a neighbor N frequency indicating the cell types of the neighbor cells are not the RC type or the FB type. For example, referring to Table 7, the set of neighbor NR frequencies may include one or more of: a neighbor RC frequency (e.g., "Neighbor-RC-Freqs") indicating the cell type of the neighbor cell is the RC type, a neighbor FB frequency (e.g., "Neighbor-FB-Freqs") indicating the cell type of the neighbor cell is the FB type, or a neighbor N frequency ("Neighbor-N-Freqs") indicating the cell types of the neighbor cells are not the RC type or the FB type.

In some aspects, the cell may be an NR cell, and, at 1002, the UE may receive, from the cell, a SIB1. The SIB1 may contain a first IE indicating the RC type. The UE may identify (at 1008) the cell type as the RC type based on the SIB1. For example, referring to FIG. 8, the UE 802 may receive, at 806, from the cell (e.g., base station 804), a SIB1. Referring to FIG. 4, the SIB1 may contain a first IE (e.g., the redCap-ConfigCommon IE) indicating the RC type. In some aspects, 1002 may be performed by the RedCap connection component 198.

In some aspects, to identify the cell type of the cell (at 1008), the UE may identify, in response to the SIB1 not containing the first IE, the cell type as the N type based on the presence of one of a set of signature conditions. The set of signature conditions may include: an initial BWP in the SIB1 larger than the bandwidth threshold, a failure in RRC setup due to an invalid BWP or an invalid channel BW configuration, a first reception of a first indication that indicates an RRC release, a second reception of a second indication that indicates an RRC reconfiguration or RRC resume indicating a channel BW larger than the bandwidth threshold and all BWPs larger than the bandwidth threshold, an HO to a second cell with an incorrect BWP, or a third reception of a third indication that indicates a post RLF or a re-establishment failure. For example, referring to FIG. 8, to identify the cell type of the cell (at 812), the UE 802 may identify, in response to the SIB1 not containing the first IE (e.g., the redCap-ConfigCommon IE), the cell type as the N type based on the presence of one of a set of signature conditions. The set of signature conditions may be the signature conditions listed in Table 3.

In some aspects, to identify the cell type of the cell (at 1008), the UE may identify, in response to an absence of all of the set of signature conditions, the cell type as the FB type. For example, referring to FIG. 8, to identify the cell type of the cell (at 812), the UE 802 may identify, in response to an absence of all of the set of signature conditions, the cell type as the FB type. The set of signature conditions may be the signature conditions listed in Table 3.

In some aspects, the cell may be an LTE cell, and, to identify the cell type of the cell (at 1008), the UE may identify the cell type of the cell based on one of: a periodic LTE-to-NR BPLMN search, or an L2N reselection, redirection, or handover to a second cell. For example, referring to FIG. 8, if the cell (base station 804) is an LTE cell, to identify the cell type of the cell (base station 804), the UE 802 may, at 812, identify the cell type based on one of: a periodic LTE-to-NR BPLMN search, or an L2N reselection, redirection, or handover to a second cell.

In some aspects, at 1004, the UE may access a network capability DB. The network capability DB may store cell information of a plurality of cells, and the cell information of the plurality of cells may include an associated cell type and an associated frequency for each cell of the plurality of cells. In some examples, to identify the cell type of the cell (at 1008), the UE may identify the cell type of the cell based on the network capability DB. For example, referring to FIG. 8, the UE 802 may access, at 808, a network capability DB 810. Referring to Table 4, the network capability DB may store cell information of a plurality of cells (e.g., NR-CGI C1, C2, C3, and C4). In some aspects, 1004 may be performed by the RedCap connection component 198.

In some aspects, the cell information of the plurality of cells may further include a set of neighbor NR frequencies associated with each cell of the plurality of cells. For example, referring to Table 4, the cell information of the plurality of cells may further include a set of neighbor NR frequencies (e.g., "Neighbor-RC-Freqs," "Neighbor-FB-Freqs," and "Neighbor-N-Freqs") associated with each cell of the plurality of cells (e.g., NR-CGI C1, C2, C3).

In some aspects, the cell information of the plurality of cells may be obtained based on one or more of: a configuration comprising (i.e., including) the cell information of the plurality of cells, a second network capability DB associated with a neighbor cell of the cell, or a third network capability DB associated with a second UE. For example, referring to Table 9, the cell information of the plurality of cells may be obtained based on one or more of: a configuration (e.g., Bands/Freqs with ≤20 MHz bandwidth configuration in the "Provisioning" approach in Table 9) including the cell information of the plurality of cells, a second network capability DB (e.g., the NR CGI network capability DB in the "Neighbor graph" approach in Table 9) associated with a neighbor cell of the cell, or a third network capability DB associated with a second UE (e.g., in the "Crowdsourcing" approach).

In some aspects, at 1006, the UE may implement a backoff mechanism for the network capability DB. The backoff mechanism may include one or more of: a cell-level backoff, a frequency-level backoff, a band-level backoff, or a tracking area level backoff to limit access to one or more of the cells of the plurality of cells. For example, referring to FIG. 8, the UE 802 may implement, at 814, a backoff mechanism for the network capability DB. Referring to FIG. 7, the backoff mechanism may include a cell-level backoff 720 and a band-level backoff 730 to limit access to one or more of the cells of the plurality of cells. In some aspects, 1006 may be performed by the RedCap connection component 198.

In some aspects, the cell-level backoff may include: limiting the access of the UE to one cell of the plurality of cells in the network capability DB for the first period of time. For example, referring to FIG. 7, the cell-level backoff 720 may include: limiting the access of the UE to one cell of the plurality of cells in the network capability DB for the first period of time ($T_1$).

In some aspects, the frequency-level backoff may include: limiting the access of the UE to one or more cells of the plurality of cells in the network capability DB operating at a frequency for the first period of time.

In some aspects, the band-level backoff may include: limiting the access of the UE to one or more cells of the plurality of cells associated with a band in the network capability DB for the second period of time. For example, referring to FIG. 7, the band-level backoff 730 may include: limiting the access of the UE to one or more cells of the plurality of cells associated with a band in the network capability DB for the second period of time ($T_2$).

In some aspects, to manage the connection between the UE and the cell (at 1010), the UE may, at 1014, manage a mobility procedure of the UE. For example, referring to FIG. 8, to manage the connection between the UE 802 and the cell (base station 804), the UE 802 may manage a mobility procedure of the UE 802. Referring to FIG. 5, the UE may perform the optimization of the mobility procedure. In some aspects, 1014 may be performed by the RedCap connection component 198.

In some aspects, the cell may be a first cell of the first RAT or the second RAT, and the mobility procedure of the UE (at 1014) may include one of: a reselection process for selecting a second cell from the plurality of cells for the UE, where the second cell may be of the second RAT, a redirection process for selecting the second cell for the UE, a connected mode measurement process for selecting the second cell for the UE, a handover for selecting the second cell for the UE, an OOS scan for selecting the second cell for the UE, an RLF scan for selecting the second cell for the UE, or a power scan for selecting the second cell for the UE. For example, referring to Table 10, the mobility procedure of the UE may include one of: the N2N or L2N reselection for selecting a second cell from the plurality of cells for the UE, the N2N or L2N redirection for selecting the second cell for the UE, the N2N or L2N connected mode measurement process for selecting the second cell for the UE, the N2N or L2N handover for selecting the second cell for the UE, the OOS scan for selecting the second cell for the UE, the RLF scan for selecting the second cell for the UE, or the power scan for selecting the second cell for the UE.

In some aspects, the first RAT may be LTE, and the second RAT may be NR. For example, referring to Table 10, the mobility procedure of the UE may include the N2N or L2N reselection for selecting the second cell from the plurality of cells for the UE, and the first cell may be an LTE cell or an NR cell (i.e., the first RAT is LTE or NR), and the second cell may be an NR cell (i.e., the second RAT is NR).

In some aspects, to manage (at 1014) the mobility procedure of the UE, the UE may assign a priority to each cell of the plurality of cells based on the cell type of each cell. The second cell may be selected based on the priority and the backoff status of each cell associated with the backoff mechanism. For example, referring to Table 10, when performing the N2N or L2N redirection, the UE may assign the priority of RC>FB>Unknown (cell with unknown RedCap feature support) to each cell of the plurality of cells based on the cell type of each cell. The second cell may be selected based on the priority (RC>FB>Unknown freqs/cell) and the backoff status of each cell (back off cell and band may be pruned) associated with the backoff mechanism.

In some aspects, a first priority for the RC type may be higher than a second priority for the FB type, and the second priority for the FB type is higher than a third priority for the N type. For example, referring to Table 10, for the N2N or L2N reselection, the RC type may have a higher priority than the FB type, and the FB type may have a higher priority than the Unknown freqs/cell.

In some aspects, the reduced capability (at 1008) may be the number of data radio bearers (DRB) limited by a DRB threshold. For example, referring to FIG. 8, the reduced capability (at 812) may be the number of DRBs limited by a DRB threshold.

In some aspects, the DRB threshold may be 8. For example, referring to FIG. 8, the reduced capability (at 812) may be the number of DRBs limited by a DRB threshold, and the DRB threshold may be 8.

In some aspects, the reduced capability (at 1008) may be a length of a sequence number used in RLC and PDCP layers limited by a length threshold. For example, referring to FIG. 8, the reduced capability (at 812) may be the length of a sequence number used in RLC and PDCP layers limited by a length threshold.

In some aspects, the length threshold may be 12. For example, referring to FIG. 8, the reduced capability (at 812) may be the length of a sequence number used in RLC and PDCP layers limited by a length threshold, and the length threshold may be 12.

FIG. 11 is a flowchart 1100 illustrating methods of wireless communication at a network node in accordance with various aspects of the present disclosure. The method may be performed by a network node. The network entity may be a base station, or a component of a base station, in the access network of FIG. 1 or a core network component (e.g., base station 102, 310, 804; or the network entity 1602 in the hardware implementation of FIG. 16). The method provides a comprehensive solution for facilitating better compatibility between RedCap UEs and network nodes that may not have been upgraded to support the RedCap features. It enhances network compatibility, reduces service delays, and improves the overall efficiency of wireless communication.

As shown in FIG. 11, at 1102, the network node may configure, based on a UE operating with reduced capability, a communication setting for the network node accommodating the reduced capability of the UE. The communication setting may reduce the communication capability of the network node. The UE may be the UE 104, 350, 802, or the apparatus 1604 in the hardware implementation of FIG. 16. FIGS. 4, 5, 6, 7, and 8 illustrate various aspects of the steps in connection with flowchart 1100. For example, referring to FIG. 8, the network node (base station 804) may configure, at 820, based on a UE 802 operating with reduced capability, a communication setting for the network node accommodating the reduced capability of the UE 802. The communication setting may reduce the communication capability of the network node (base station 804). For example, when the reduced capability of the UE 802 is that the operational frequency bandwidth of the UE 802 is limited by the bandwidth threshold of 20 MHz, the base station 804 may configure up to the UE's capability of 20 MHz bandwidth, even though the base station 804 may be capable of communicating at a bandwidth larger than 20 MHz. In some aspects, 1102 may be performed by the RedCap connection component 199.

At 1104, the network node may communicate, based on the communication setting, with the UE. For example, referring to FIG. 8, the network node (base station 804) may communicate, at 822, with the UE 802 based on the communication setting. For example, when the reduced capability of the UE 802 is that the operational frequency bandwidth of the UE 802 is limited by the bandwidth threshold of 20 MHz, the base station 804 and the UE 802 may communicate at the bandwidth of not more than 20 MHz. In some aspects, 1104 may be performed by the RedCap connection component 199.

FIG. 12 is a flowchart 1200 illustrating methods of wireless communication at a network node in accordance with various aspects of the present disclosure. The method may be performed by a network node. The network entity may be a base station, or a component of a base station, in the access network of FIG. 1 or a core network component (e.g., base station 102, 310, 804; or the network entity 1602 in the hardware implementation of FIG. 16). The method provides a comprehensive solution for facilitating better compatibility between RedCap UEs and network nodes that may not have been upgraded to support the RedCap features. It enhances network compatibility, reduces service delays, and improves the overall efficiency of wireless communication.

As shown in FIG. 12, at 1202, the network node may configure, based on a UE operating with reduced capability, a communication setting for the network node accommodating the reduced capability of the UE. The communication setting may reduce the communication capability of the network node. The UE may be the UE 104, 350, 802, or the apparatus 1604 in the hardware implementation of FIG. 16. FIGS. 4, 5, 6, 7, and 8 illustrate various aspects of the steps in connection with flowchart 1200. For example, referring to FIG. 8, the network node (base station 804) may configure, at 820, based on a UE 802 operating with reduced capability, a communication setting for the network node accommodating the reduced capability of the UE 802. The communication setting may reduce the communication capability of the network node (base station 804). For example, when the reduced capability of the UE 802 is that the operational frequency bandwidth of the UE 802 is limited by the bandwidth threshold of 20 MHz, the base station 804 may configure up to the UE's capability of 20 MHz bandwidth, even though the base station 804 may be capable of communicating at a bandwidth larger than 20 MHz. In some aspects, 1202 may be performed by the RedCap connection component 199.

At 1204, the network node may communicate, based on the communication setting, with the UE. For example, referring to FIG. 8, the network node (base station 804) may communicate, at 822, with the UE 802 based on the communication setting. For example, when the reduced capability of the UE 802 is that the operational frequency bandwidth of the UE 802 is limited by the bandwidth threshold of 20 MHz, the base station 804 and the UE 802 may communicate at the bandwidth of not more than 20 MHz. In some aspects, 1204 may be performed by the RedCap connection component 199.

In some aspects, at 1206, the reduced capability may include one of: an operational frequency bandwidth of the UE limited by a bandwidth threshold, the number of DRB limited by a DRB threshold, or the length of a sequence number used in RLC and PDCP layers limited by a length threshold. For example, the reduced capability may be one of: the operational frequency bandwidth of the UE is limited by a bandwidth threshold of, for example, 20 MHz, the number of DRB is limited by a DRB threshold of, for example, 8, or the length of a sequence number used in RLC and PDCP layers is limited by a length threshold of, for example, 12.

In some aspects, the UE may operate in one of two device modes: the RC-only mode (or RC mode) or the FB-allowed mode. This flexibility allows the device to enable or disable its fallback mode. The main difference between the RC mode and the FB-allowed mode lies in the UE's ability to connect to non-RedCap cells (e.g., a cell of FB type). In RC mode, the UE may not access a non-RedCap cell. On the other hand, in FB-allowed mode, the UE has the flexibility to connect to a non-RedCap cell, such as FB type cells. A UE in FB-allowed mode may not access the N type cell. In some examples, the network operators or original equipment manufacturers (OEMs) may set up the device mode. In some examples, the control of the device mode may be managed by the public land mobile network (PLMN) or may be tailed on a per operator or per mobile country code (MCC) basis.

In some aspects, when the UE operates in the FB-allowed mode, the UE may dynamically update its capability. For example, the UE may initially start in an RC state, which may be labeled as "In-Use-Capability=RC" (i.e., the supportOfRedCap-r17 IE is included in UE capability report). When a UE is in the RC state, the UE may not access (e.g., connect to) non-RedCap cells (e.g., a FB type cell). Under certain conditions (e.g., when a first condition associated with the UE is met), the UE may transition to a non-RC (NRC) state, which may be labeled as "In-Use-Capability=NRC" (i.e., the supportOfRedCap-r17 IE is removed). When a UE is in the NRC state, the UE may have the flexibility to access (e.g., connect to) non-RedCap cells, such as FB type cells. In some examples, the UE may revert back to the RC state ("In-Use-Capability=RC") when another set of specific conditions is met (e.g., when a second condition associated with the UE is met).

In some aspects, the capability updates may be performed through the mobility registration update (MRU) with the capability update bit set when the UE is in idle mode.

FIG. 13 is a diagram 1300 illustrating an example of state switching in the FB-allowed mode in accordance with various aspects of the present disclosure. In FIG. 13, when the UE operates in the FB-allowed mode, the UE may initialize (at 1312) to start with the RC state 1302 (e.g., In-Use-Capability=RC). When certain conditions (e.g., the first condition associated with the UE) are met, the UE may transition, at 1314, to the NRC state 1304 (e.g., In-Use-Capability=NRC). The UE operating in the NRC state may revert back, at 1316, to the RC state 1302 (e.g., In-Use-Capability=RC) when another set of conditions (e.g., the second condition associated with the UE) is met.

In some examples, the first condition may be the UE determining, based on system information block type 1 (SIB1) of the target cell, that the target cell is not the RC type, the UE having an out-of-service (OOS) duration longer than a first time threshold, or the UE identifying no cell in a plurality of cells as having the cell type of the RC type or the LTE type during a radio link failure (RLF) recovery process, and the UE identifying a first number of cells of an NRC type in the plurality of cells, and the first number is greater than a first counter threshold. In some examples, the first counter threshold may be 0. In some examples, the first condition may be the UE connecting with an LTE cell of the LTE type for longer than a second time threshold, and a second number of neighbor cells of the NRC type in the plurality of cells being available, and the second number is greater than the first counter threshold.

In some examples, the second condition may include the UE determining, based on the SIB1 of the target cell, that the target cell is the RC type. In some examples, the second condition may include the UE being connected with an LTE cell of the LTE type in the plurality of cells and the number of available cells of the RC type in the plurality of cells being larger than a first number threshold. In some examples, the second condition may be the UE being connected with an RC cell of the RC type in the plurality of cells and the number of available cells of the RC type in the plurality of cells being larger than the first number threshold.

Table 11 shows the exemplary conditions under which the UE may transition between the RC state and the NRC state.

TABLE 11

Exemplary conditions under which the UE transitions between the RC state and the NRC state.

| Description | Conditions | Comments |
|---|---|---|
| In-use Capability = RC → In-use Capability = NRC | First condition: 1. Determining, upon reading SIB1 of the target cell, that the target cell is no the RC type, 2. OOS longer than a first time threshold (e.g., T_OOS seconds), 3. No suitable RC or LTE cells found during RLF recovery & a first number of suitable NRC neighbor cells available (based on fingerprinting), and the first number is larger than | All other UE capabilities stay unchanged upon this state transition. Suitable NRC cell = NRC gNB passes validation in idle (SIB1) and connected mode (rrcSetup, rrcReconfiguration, etc.) |

TABLE 11-continued

| Exemplary conditions under which the UE transitions between the RC state and the NRC state. | | |
|---|---|---|
| Description | Conditions | Comments |
| | a first counter threshold, or 4. Stay in LTE longer than a second time threshold (e.g., T_LTE seconds) & a second number of suitable NRC neighbor cells available (based on fingerprinting) and the second number is larger than the first counter threshold. | |
| In-use Capability = NRC → In-use Capability = RC | Second condition: 1. Determining, based on system information block type 1 (SIB1) of the target cell, that the target cell is the RC type, 2. When camp on LTE & at least N_rcFreq RC freqs (or cells) available (based on fingerprinting), or 2. When camp on RC gNB & at least N_rcFreq RC freqs (or cells) available (freq configured in SIB4 w/ redCapAccessAllowed flag present, and based on fingerprinting). | All other UE capabilities stay unchanged upon this state transition. |

In some aspects, depending on the state of the UE (e.g., RC state of NRC state), the UE behavior (e.g., during the mobility management) may vary. Table 12 shows exemplary UE behaviors under various UE states.

TABLE 12

| Exemplary UE behaviors under various UE states | | |
|---|---|---|
| State | Descriptions | UE Behavior |
| In-use Capability = RC | UE device is in FB-allowed mode, and UE capability = RC | Follows 3GPP spec. Camps on RC or LTE cells: RC > LTE in priority. Schedule RC frequency first and then LTE. Reselection: follow configuration for simplicity (expect RC to have higher reselection priority than LTE). MR: similar rule as above. |
| In-use Capability = NRC | UE device is in FB-allowed mode, and UE capability = NRC. | Can camp on RC or LTE cells: RC > NRC FDD > NRD TDD > LTE in priority. This order does NOT include serving frequency |

In some aspects, the choice of the device mode may affect various elements of the UE's functionalities, including which network (or cell) the UE may connect with and the capabilities the UE may possess. For example, when the UE operates in the RC-only mode, it may connect with a network (or cell) of the RC type or LTE type, and the UE's capabilities may be RC-capable (e.g., the UE may operate in the RC state). When the UE operates in the FB-allowed mode, it may connect with a network (or cell) of the RC type, the non-RC (NRC) type, or the LTE type. The UE's capability may be RC-capable (e.g., the RC state) initially and, in some examples, may be downgraded to NRC at some time (e.g., the NRC state). Table. 13 shows example accessible networks and UE capabilities associated with the device modes.

TABLE 13

| Example accessible networks and UE capabilities associated with the device modes | | |
|---|---|---|
| Device mode | Accessible Network | UE Capabilities |
| RC-only FB-allowed | RC and LTE RC, NRC and LTE | RC-capable (all the time) Start with RC-capable Downgrade to NRC at some time |

In some aspects, a default mode may be chosen among these two device modes. In some examples, the RC-only mode may be chosen as the default mode. Then, the FB-allowed mode may be treated as an "exception" list. In some examples, the FB-allowed mode may be chosen as the default mode, with the RC-only mode being treated as an "exception" list. This approach may be beneficial during the initial deployment stage of the RedCap UE, where there would be a mixture of RC and NRC cells in many places, and the operators would likely to apply the fallback mode to facilitate the UE's mobility. The UE may have the control over the device mode and the ability to switch the device mode. For example, the UE may have a set of network identifiers that allow one of the two device modes. The network identifier may be the PLMN, the MCC, or the network operator that allows the one of the two device modes. For example, the UE may maintain a list of PLMNs (or MCCs, or network operators) that allow the FB-allowed mode, and the list may include the PLMNs (or the MCCs, the network operators) where the UE may enable the fall-back mode. When there's a change in the network identifier, such as switching from one PLMN, MCC, or network operator to another, the UE may switch between the FB-allowed mode and the RC-only mode dynamically. In some examples, the default device mode of a UE may be config-urable (e.g., configured by a "default device mode" configu-ration). In some examples, a UE may identify the PLMN, MCC or other information of the camped cell, and set its default device mode accordingly. For example, a UE may initially have the default device mode set as the RC-only mode. However, when the UE moves to a cell (e.g., RC type or LTE type cells) and identifies that the PLMN belongs to the list of PLMNs that allow the FB-allowed mode, the UE may change the default device mode to the FB-allowed mode.

In some aspects, when the UE encounters a failure during the mobility procedure, such as when a UE fails to camp on an NRC cell (e.g., when in callback mode), the UE may limit its access to one or more cells of the plurality of cells associated with a band for a first period of time. That is, the UE may initiate the second-stage backoff (e.g., a band-level backoff) to block a band for a certain period of time, without waiting for the first-stage (e.g., cell-level) backoff to happen. Example use cases of these mechanisms may include the applications where it is crucial to maintain uninterrupted communications, such as emergency calls or communica-tions for high-priority services.

FIG. 14 is a flowchart 1400 illustrating methods of wireless communication at a UE in accordance with various aspects of the present disclosure. The method may be performed by a UE. The UE may be the UE 104, 350, 802, or the apparatus 1604 in the hardware implementation of FIG. 16. The method provides a comprehensive solution for facilitating better compatibility between RedCap UEs and network nodes that may not have been upgraded to support the RedCap features. It enhances network compatibility, reduces service delays, and improves the overall efficiency of wireless communication.

As shown in FIG. 14, at 1402, the UE may identify, based on a support of a cell for the UE operating with reduced capability, a cell type of the cell. The cell type may be one of an RC type, an FB type, or an N type. The RC type may indicate a full support for the UE operating with the reduced capability, the FB type may indicate a compatible support for the UE operating with the reduced capability and a support for establishing a connection with the UE operating with the reduced capability, and the N type may indicate the lack of the support for the UE operating with the reduced capability and a lack of the support for establishing the connection with the UE operating with the reduced capa-bility. The reduced capability features may include, for example, the operational frequency bandwidth of the UE limited by a bandwidth threshold, the number of DRB limited by a DRB threshold, or the length of a sequence number used in RLC and PDCP layers limited by a length threshold. As used herein, an RC type cell having a "full support" for the UE operating with the reduced capability means the cell's capability aligns with the reduced capability of the UE. For example, if the reduced capability feature of a UE is that the operational frequency bandwidth of the UE is limited by a bandwidth threshold, an RC type cell may have the capability to operate on the same bandwidth as that limited by the bandwidth threshold. An FB type cell having a "compatible support" for the UE operating with the reduced capability means that the cell's capability may surpass the UE's reduced capability. However, the cell can reduce its capability to accommodate the UE's reduced capability if needed (e.g., for the purpose of connecting with the UE). For example, an FB type cell may have the capability to operate beyond a UE's reduced capability. Nevertheless, the cell can accept (e.g., connect to) a UE in the NRC state (e.g., with supportOfRedCap-r17 IE removed) that has physical limitations equivalent to those of RC-capable UEs, and operate at a downgraded capability (e.g., a subset of its full capability) on the network side. For example, if the reduced capability feature of a UE is that the operational frequency bandwidth of the UE is limited by a bandwidth threshold, then an FB type cell may have the capability to operate on a bandwidth exceeding the band-width threshold. Nevertheless, this cell can connect to the UE whose operational frequency bandwidth is limited by the bandwidth threshold, and, as a result, the cell is able to operate at the bandwidth limited by the bandwidth threshold on the network side when connecting with this UE. FIGS. 4, 5, 6, 7, 8 and 13 illustrate various aspects of the steps in connection with flowchart 1400. For example, referring to FIG. 8, the UE 802 may identify, at 812, based on the support of a cell for the UE operating with reduced capa-bility, a cell type of the cell. Referring to FIG. 5, at 512, the UE may determine the cell type (e.g., as the RC type, the FB type, or the N type). In some aspects, 1402 may be per-formed by the RedCap connection component 198.

At 1404, the UE may configure a device mode of the UE, where the device mode includes the RC mode or the FB-allowed mode. For example, referring to Table 13, the device mode may include the RC-only mode (or RC mode) and the FB-allowed mode. In RC mode, the UE may not access a non-RedCap cell (e.g., FB type cells). On the other hand, in FB-allowed mode, the UE has the flexibility to connect to a non-RedCap cell, such as FB type cells. In some aspects, 1404 may be performed by the RedCap connection component 198.

At 1406, the UE may manage, based on the device mode and the cell type, the connection between the UE and the cell. For example, referring to FIG. 5, the UE may manage, at 520, a connection between the UE and the cell based on the device mode and the cell type. In some aspects, 1406 may be performed by the RedCap connection component 198.

In some aspects, the UE may output an indication of the managed connection between the UE and the cell. For example, referring to FIG. 8, the UE 802 may output, at 818, an indication of the managed connection between the UE and the cell.

In some aspects, the reduced capability may include one of: an operational frequency bandwidth of the UE limited by a bandwidth threshold, a number of DRB limited by a DRB threshold, or a length of a sequence number used in RLC and PDCP layers limited by a length threshold.

In some aspects, the RC mode may indicate the UE operating with the reduced capability, and the FB-allowed mode may indicate an enablement of the UE to connect with a non-RedCap cell, such as FB type cells.

In some aspects, the UE may receive a mode configura-tion indicating the device mode, and to configure the device mode of the UE (at 1404), the UE may configure the device mode of the UE based on the mode configuration.

In some aspects, the UE may store a set of network identifiers. Each network identifier of the set of network identifiers may have an associated device mode. To configure the device mode of the UE (at 1404), the UE may configure the device mode of the UE based on an association of the cell with the set of network identifiers.

In some aspects, each network identifier of the set of network identifiers may include one or more of: a PLMN, a MCC, or a network operator.

In some aspects, to configure the device mode of the UE (at 1404), the UE may configure the device mode of the UE as the FB-allowed mode, and the UE may further update the capability state of the UE. The capability state may include an RC state indicating an activation of the UE operating with the reduced capability and an NRC state indicating an enablement of the UE to connect with a non-RedCap cell, such as FB type cells. For example, referring to Table 12, when the UE is in the FB-allowed mode, the UE may further update the capability state of the UE. The capability state may be an RC state (e.g., "In-use Capability=RC") indicating an activation of the UE operating with the reduced capability or an NRC state (e.g., "In-use Capability=NRC") indicating an enablement of the UE connecting with a target cell of the FB type.

In some aspects, to manage the connection between the UE and the cell (at 1406), the UE may manage a mobility procedure of the UE with respect to a plurality of cells.

In some aspects, the cell may be a first cell, and the mobility procedure of the UE may include: a reselection process for selecting a second cell from the plurality of cells for the UE, a redirection process for selecting the second cell for the UE, a connected mode measurement process for selecting the second cell for the UE, a handover for selecting the second cell for the UE, an out-of-service (OOS) scan for selecting the second cell for the UE, a radio link failure (RLF) scan for selecting the second cell for the UE, or a power scan for selecting the second cell for the UE. For example, referring to FIG. 5, the mobility procedure of the UE may include, among others, a reselection process, a redirection process, a connected mode measurement process, a handover, an OOS scan, an RLF scan, or a power scan.

In some aspects, to update the capability state of the UE, the UE may update, via a mobility registration update, the capability state of the UE.

In some aspects, to update the capability state of the UE, the UE may switch, in response to a first condition associated with the UE being met, the capability state of the UE from the RC state to the NRC state, or switch, in response to a second condition associated with the UE being met, the capability state of the UE from the NRC state to the RC state. For example, referring to FIG. 13, the UE may switch, at 1314, in response to a first condition associated with the UE being met, the capability state of the UE from the RC state 1302 to the NRC state 1304, or switch, at 1316, in response to a second condition associated with the UE being met, the capability state of the UE from the NRC state 1304 to the RC state 1302.

In some aspects, the first condition may include one or more of: the UE determining, based on system information block type 1 (SIB1) of the second cell, the second cell is not the RC type, the UE including an OOS duration longer than a first time threshold, the UE identifying no cell in the plurality of cells as having the cell type of the RC type or the LTE type during an RLF recovery process, and the UE identifying a first number of cells of an NRC type in the plurality of cells, where the first number is greater than a first counter threshold, or the UE connecting with an LTE cell of the LTE type for longer than a second time threshold, and a second number of neighbor cells of the NRC type in the plurality of cells being available, where the second number is greater than the first counter threshold. For example, referring to Table 11, the condition (e.g., the first condition) under which the UE may switch from the RC state to the NRC state may include the UE determining, based on SIB1 of the target cell, the target cell is not the RC type, the OOS longer than a first time threshold (e.g., T_OOS seconds), no suitable RC or LTE cells found during the RLF recovery process and a first number of suitable NRC neighbor cells are available (and the first number is larger than a first counter threshold (e.g., N_NRC)), or staying in LTE longer than a second time threshold (e.g., T_LTE seconds) and a second number of suitable NRC neighbor cells are available (and the second number is larger than the first counter threshold (e.g., N_NRC)).

In some aspects, the second condition may include one or more of: the UE determining, based on SIB1 of the second cell, the second cell is the RC type, the UE being connected with an LTE cell of the LTE type in the plurality of cells, and a number of available cells of the RC type in the plurality of cells being larger than a first threshold, or the UE being connected with an RC cell of the RC type in the plurality of cells, and the number of available cells of the RC type in the plurality of cells being larger than the first threshold. For example, referring to Table 11, the condition (e.g., the second condition) under which the UE may switch from the NRC state to the RC state may include: the UE determining, based on SIB1 of the target cell, that the target cell is the RC type, when the UE camps on LTE and at least N_rcFreq RC frequency (or cells) available, or when the UE camps on RC cells and at least N_rcFreq RC frequency (or cells) available (frequency configured in SIB4 with redCapAccessAllowed flag present).

In some aspects, to update the capability state of the UE, the UE may set the capability state of the UE to the RC state, and to manage the mobility procedure of the UE, the UE may assign a priority for each cell of the plurality of cells based on the cell type of each cell, where the first priority for the RC type is higher than the second priority for the LTE type; and manage, in response to the second cell being one of the RC type or the LTE type, the mobility procedure of the UE based on the priority of the second cell. For example, referring to Table 12, when the UE is in the RC state (In-use Capability=RC), the UE may assign a priority for each cell of the plurality of cells, and the RC type cells may have a higher priority than the LTE type cells.

In some aspects, to update the capability state of the UE, the UE may set the capability state of the UE to the NRC state, and to manage the mobility procedure of the UE, the UE may assign a priority for each cell of the plurality of cells based on the cell type of each cell, and where a first priority for the RC type is higher than a second priority for an NRC type, the second priority is higher than a third priority for an frequency division duplex (FDD) type, the third priority is higher than a fourth priority for a time division duplex (TDD) type, and the fourth priority is higher than a fifth priority for the LTE type; and manage the mobility procedure of the UE based on the priority for each cell of the plurality of cells. For example, referring to Table 12, when the UE is in the NRC state (In-use Capability=NRC), the UE may assign a priority for each cell of the plurality of cells, and the order of the priorities for different types of cells is RC>FDD>TDD>LTE.

In some aspects, to manage the mobility procedure of the UE, the UE may limit, in response to a failure of the mobility procedure of the UE, an access of the UE to one or more cells of the plurality of cells associated with a band for a first period of time.

FIG. 15 is a flowchart 1500 illustrating methods of wireless communication at a network node in accordance with various aspects of the present disclosure. The method may be performed by a network node. The network entity may be a base station, or a component of a base station, in the access network of FIG. 1 or a core network component (e.g., base station 102, 310, 804; or the network entity 1602 in the hardware implementation of FIG. 16). The method provides a comprehensive solution for facilitating better compatibility between RedCap UEs and network nodes that may not have been upgraded to support the RedCap features. It enhances network compatibility, reduces service delays, and improves the overall efficiency of wireless communication.

As shown in FIG. 15, at 1502, the network node may configure, based on a UE operating with a reduced capability, a communication setting for the network node accommodating the reduced capability of the UE. The communication setting reduces a communication capability of the network node. The UE may be the UE 104, 350, 802, or the apparatus 1604 in the hardware implementation of FIG. 16. FIGS. 4, 5, 6, 7, 8, and 13 illustrate various aspects of the steps in connection with flowchart 1500. For example, referring to FIG. 8, the network node (base station 804) may configure, at 820, based on a UE 802 operating with reduced capability, a communication setting for the network node accommodating the reduced capability of the UE 802. The communication setting may reduce the communication capability of the network node (base station 804). For example, when the reduced capability of the UE 802 is that the operational frequency bandwidth of the UE 802 is limited by the bandwidth threshold of 20 MHz, the base station 804 may configure up to the UE's capability of 20 MHz bandwidth, even though the base station 804 may be capable of communicating at a bandwidth larger than 20 MHz. In some aspects, 1502 may be performed by the RedCap connection component 199.

At 1504, the network node may communicate, based on the communication setting and a device mode of the UE, with the UE, where the device mode includes a reduced capability (RC) mode or a fallback (FB)-allowed mode. For example, referring to FIG. 8, the network node (base station 804) may communicate, at 822, with the UE 802 based on the communication setting and the device mode of the UE 802. In some aspects, 1504 may be performed by the RedCap connection component 199.

In some aspects, the reduced capability of the UE includes one of: an operational frequency bandwidth of the UE limited by a bandwidth threshold, a number of DRB limited by a DRB threshold, or a length of a sequence number used in RLC and PDCP layers limited by a length threshold.

In some aspects, the RC mode may indicate the UE operating with the reduced capability, and the FB-allowed mode may indicate an enablement of the UE to connect with a non-RedCap cell, such as FB type cells.

In some aspects, the network node may transmit, for the UE, a mode configuration indicating the device mode.

In some aspects, the device mode may be based on an association of the network node with a set of network identifiers.

In some aspects, each network identifier of the set of network identifiers may include one or more of: a PLMN, a mobile country code, or a network operator.

Figure 16:
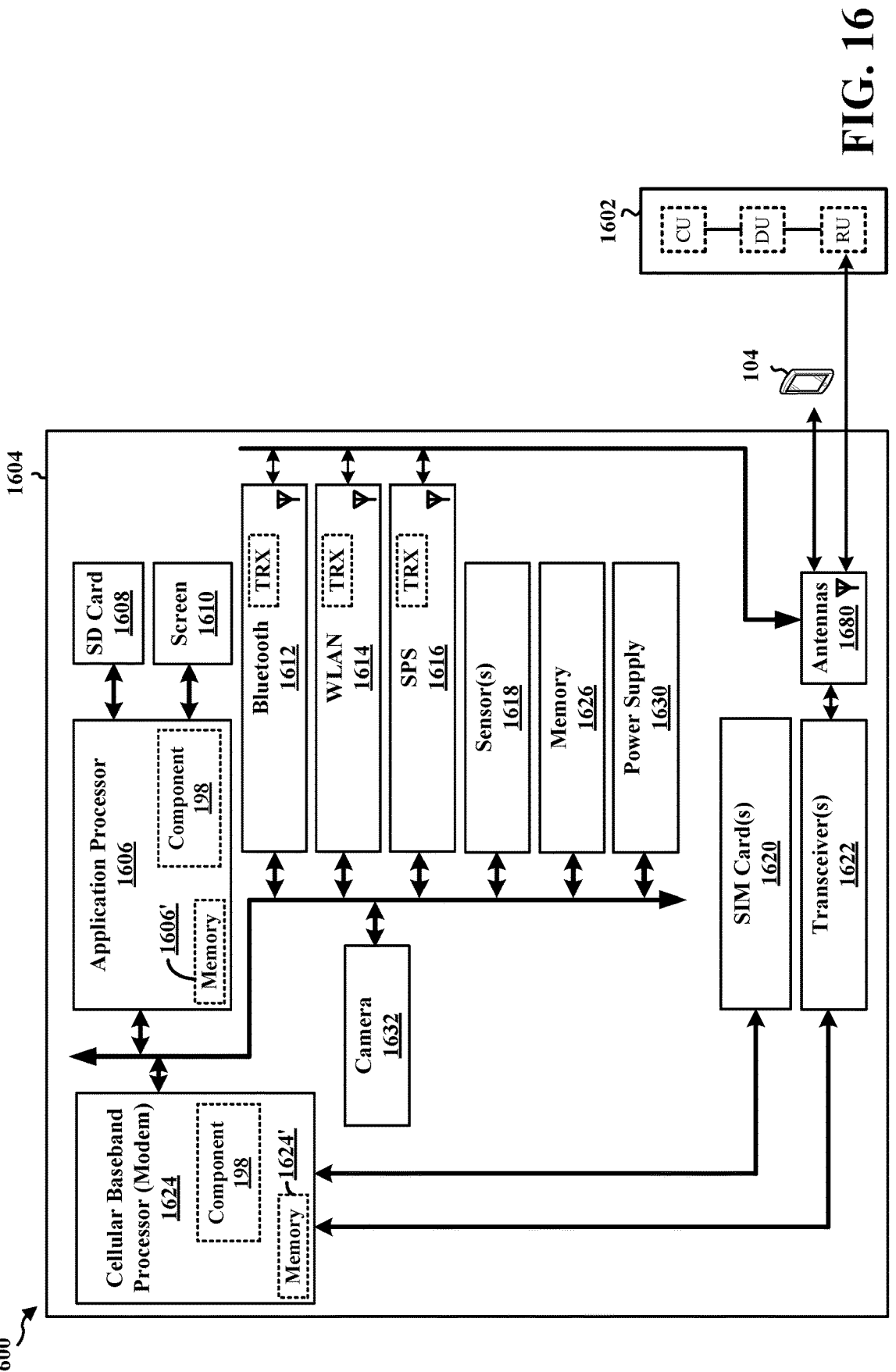
FIG. 16 is a diagram illustrating an example of a hardware implementation for an example apparatus and/or network entity.

FIG. 16 is a diagram 1600 illustrating an example of a hardware implementation for an apparatus 1604. The apparatus 1604 may be a UE, a component of a UE, or may implement UE functionality. In some aspects, the apparatus 1604 may include at least one cellular baseband processor 1624 (also referred to as a modem) coupled to one or more transceivers 1622 (e.g., cellular RF transceiver). The cellular baseband processor(s) 1624 may include at least one on-chip memory 1624'. In some aspects, the apparatus 1604 may further include one or more subscriber identity modules (SIM) cards 1620 and at least one application processor 1606 coupled to a secure digital (SD) card 1608 and a screen 1610. The application processor(s) 1606 may include on-chip memory 1606'. In some aspects, the apparatus 1604 may further include a Bluetooth module 1612, a WLAN module 1614, an SPS module 1616 (e.g., GNSS module), one or more sensor modules 1618 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1626, a power supply 1630, and/or a camera 1632. The Bluetooth module 1612, the WLAN module 1614, and the SPS module 1616 may include an on-chip transceiver (TRX) (or in some cases, just a receiver (RX)). The Bluetooth module 1612, the WLAN module 1614, and the SPS module 1616 may include their own dedicated antennas and/or utilize the antennas 1680 for communication. The cellular baseband processor(s) 1624 communicates through the transceiver(s) 1622 via one or more antennas 1680 with the UE 104 and/or with an RU associated with a network entity 1602. The cellular baseband processor(s) 1624 and the application processor(s) 1606 may each include a computer-readable medium/memory 1624', 1606', respectively. The additional memory modules 1626 may also be considered a computer-readable medium/memory. Each computer-readable medium/memory 1624', 1606', 1626 may be non-transitory. The cellular baseband processor(s) 1624 and the application processor(s) 1606 are each responsible for general processing, including the execution of software stored on the computer-readable medium/memory. The software, when executed by the cellular baseband processor(s) 1624/application processor(s) 1606, causes the cellular baseband processor(s) 1624/application processor(s) 1606 to perform the various functions described supra. The cellular baseband processor(s) 1624 and the application processor(s) 1606 are configured to perform the various functions described supra based at least in part of the information stored in the memory. That is, the cellular baseband processor(s) 1624 and the application processor(s) 1606 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1624/application processor(s) 1606 when executing software. The cellular baseband processor(s) 1624/application processor(s) 1606 may be a component of the UE 350 and may include the at least one memory 360 and/or at least one of the TX processor 368, the RX processor 356, and the controller/processor 359. In one configuration, the apparatus 1604 may be at least one processor chip (modem and/or application) and include just the cellular baseband processor(s) 1624 and/or the application processor(s) 1606, and in another configuration, the apparatus 1604 may be the entire UE (e.g., see UE 350 of FIG. 3) and include the additional modules of the apparatus 1604.

As discussed supra, the component 198 may be configured to identify, based on a support of a cell for the UE operating with reduced capability, a cell type of the cell. The cell type may be one of the RC type, the FB type, or the N type. The RC type may indicate a full support for the UE operating with the reduced capability, the FB type may indicate a compatible support for the UE operating with the reduced capability and a support for establishing a connection with the UE operating with the reduced capability, and the N type may indicate the lack of the support for the UE operating with the reduced capability and a lack of the support for establishing a connection with the UE operating with the reduced capability. The component 198 may be further configured to manage, based on the cell type, a connection between the UE and the cell. In some aspects, the component 198 may be configured to identify, based on a support of a cell for the UE operating with reduced capability, a cell type of the cell, where the cell type is one of the RC type, the FB type, or the N type, where the RC type indicates a full support for the UE operating with the reduced capability, the FB type indicates a compatible support for the UE operating with the reduced capability and a support for establishing a connection with the UE operating with the reduced capability, and the N type indicates the lack of the support for the UE operating with the reduced capability and a lack of the support for establishing the connection with the UE operating with the reduced capability; configure a device mode of the UE, where the device mode includes an RC mode or a FB-allowed mode; and manage, based on the device mode and the cell type, the connection between the UE and the cell. The component 198 may be further configured to perform any of the aspects described in connection with the flowcharts in FIG. 9, FIG. 10, FIG. 14, and/or performed by the UE 802 in FIG. 8. The component 198 may be within the cellular baseband processor(s) 1624, the application processor(s) 1606, or both the cellular baseband processor(s) 1624 and the application processor(s) 1606. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1604 may include a variety of components configured for various functions. In one configuration, the apparatus 1604, and in particular the cellular baseband processor(s) 1624 and/or the application processor(s) 1606, includes means for identifying, based on a support of a cell for the UE operating with reduced capability, a cell type of the cell. The cell type may be one of the RC type, the FB type, or the N type. The RC type may indicate a full support for the UE operating with the reduced capability, the FB type may indicate a compatible support for the UE operating with the reduced capability and a support for establishing a connection with the UE operating with the reduced capability, and the N type may indicate the lack of the support for the UE operating with the reduced capability and a lack of the support for establishing a connection with the UE operating with the reduced capability. The apparatus 1604, and in particular the cellular baseband processor(s) 1624 and/or the application processor(s) 1606, may further include means for managing, based on the cell type, a connection between the UE and the cell. In some aspects, the apparatus 1604, and in particular the cellular baseband processor(s) 1624 and/or the application processor(s) 1606, may include means for managing, based on the cell type, a connection between the UE and the cell. In some aspects, the component 198 may be configured to identify, based on a support of a cell for the UE operating with reduced capability, a cell type of the cell, where the cell type is one of the RC type, the FB type, or the N type, where the RC type indicates a full support for the UE operating with the reduced capability, the FB type indicates a compatible support for the UE operating with the reduced capability and a support for establishing a connection with the UE operating with the reduced capability, and the N type indicates the lack of the support for the UE operating with the reduced capability and a lack of the support for establishing the connection with the UE operating with the reduced capability, means for configuring a device mode of the UE, where the device mode includes an RC mode or a FB-allowed mode, and means for managing, based on the device mode and the cell type, the connection between the UE and the cell. The apparatus 1604 may further include means for performing any of the aspects described in connection with the flowcharts in FIG. 9, FIG. 10, and FIG. 14 and/or aspects performed by the UE 802 in FIG. 8. The means may be the component 198 of the apparatus 1604 configured to perform the functions recited by the means. As described supra, the apparatus 1604 may include the TX processor 368, the RX processor 356, and the controller/processor 359. As such, in one configuration, the means may be the TX processor 368, the RX processor 356, and/or the controller/processor 359 configured to perform the functions recited by the means.

Figure 17:
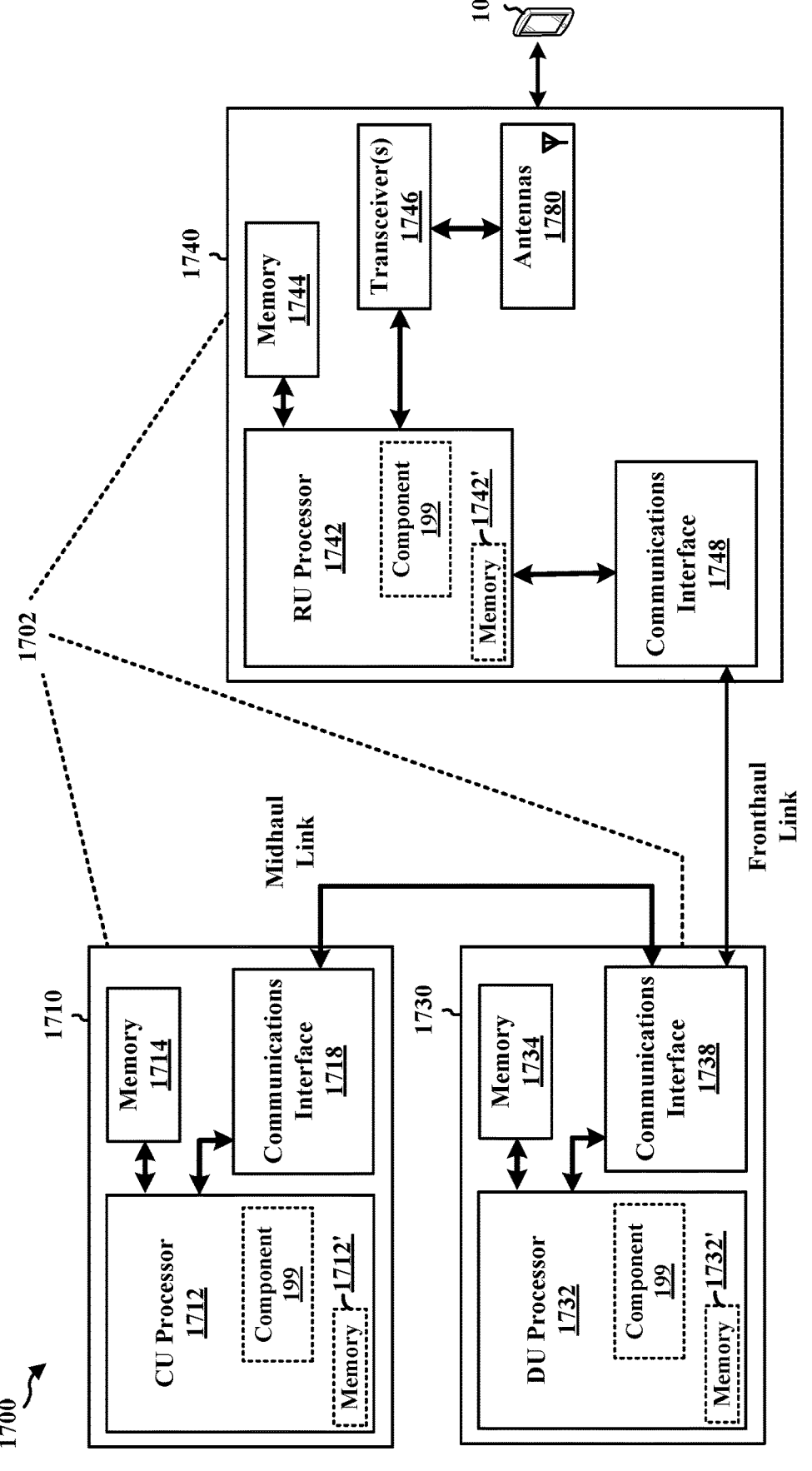
FIG. 17 is a diagram illustrating an example of a hardware implementation for an example apparatus and/or network entity.

FIG. 17 is a diagram 1700 illustrating an example of a hardware implementation for a network entity 1702. The network entity 1702 may be a BS, a component of a BS, or may implement BS functionality. The network entity 1702 may include at least one of a CU 1710, a DU 1730, or an RU 1740. For example, depending on the layer functionality handled by the component 199, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include at least one CU processor 1712. The CU processor(s) 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include at least one DU processor 1732. The DU processor(s) 1732 may include on-chip memory 1732'. In some aspects, the DU 1730 may further include additional memory modules 1734 and a communications interface 1738. The DU 1730 communicates with the RU 1740 through a fronthaul link. The RU 1740 may include at least one RU processor 1742. The RU processor(s) 1742 may include on-chip memory 1742'. In some aspects, the RU 1740 may further include additional memory modules 1744, one or more transceivers 1746, antennas 1780, and a communications interface 1748. The RU 1740 communicates with the UE 104. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to configure, based on a UE operating with reduced capability, a communication setting for the network node accommodating the reduced capability of the UE, where the communication setting reduces a communication capability of the network node; and communicate, based on the communication setting, with the UE. In some aspects, the component 199 may be configured to configure, based on a UE operating with a reduced capability, a communication setting for the network node accommodating the reduced capability of the UE, where the communication setting reduces a communication capability of the network node; and communicate, based on the communication setting and a device mode of the UE, with the UE, where the device mode includes an RC mode or an FB-allowed mode. The component 199 may be further configured to perform any of the aspects described in connection with the flowcharts in FIG. 11, FIG. 12, and FIG. 15 and/or performed by the base station 804 in FIG. 8. The component 199 may be within one or more processors of one or more of the CU 1710, DU 1730, and the RU 1740. The component 199 may be one or more hardware components specifically configured to carry out the stated processes/algorithm, implemented by one or more processors configured to perform the stated processes/ algorithm, stored within a computer-readable medium for implementation by one or more processors, or some combination thereof. When multiple processors are implemented, the multiple processors may perform the stated processes/algorithm individually or in combination. The network entity 1702 may include a variety of components configured for various functions. In one configuration, the network entity 1702 includes means for configuring, based on a UE operating with reduced capability, a communication setting for the network node accommodating the reduced capability of the UE, where the communication setting reduces a communication capability of the network node, and means for communicating, based on the communication setting, with the UE. In one configuration, the network entity 1702 may include means for configuring, based on a UE operating with a reduced capability, a communication setting for the network node accommodating the reduced capability of the UE, where the communication setting reduces a communication capability of the network node, and means for communicating, based on the communication setting and a device mode of the UE, with the UE, where the device mode includes an RC mode or an FB-allowed mode. The network entity 1702 may further include means for performing any of the aspects described in connection with the flowcharts in FIG. 11, FIG. 12, and FIG. 15, and/or aspects performed by the base station 804 in FIG. 8. The means may be the component 199 of the network entity 1702 configured to perform the functions recited by the means. As described supra, the network entity 1702 may include the TX processor 316, the RX processor 370, and the controller/ processor 375. As such, in one configuration, the means may be the TX processor 316, the RX processor 370, and/or the controller/processor 375 configured to perform the functions recited by the means.

This disclosure provides a method for wireless communication at a UE. The method may include identifying, based on a support for the UE operating with reduced capability, a cell type of a cell. The cell type may be one of the RC type, the FB type, or the N type. The RC type may indicate a full support for the UE operating with the reduced capability, the FB type may indicate a compatible support for the UE operating with the reduced capability and a support for establishing a connection with the UE operating with the reduced capability (e.g., support for a bandwidth that is less than or equal to a bandwidth threshold), and the N type may indicate the lack of the support for the UE operating with the reduced capability and a lack of the support for establishing a connection with the UE operating with the reduced capability (e.g., lack of support for the bandwidth that is less than or equal to the bandwidth threshold). The method may further include managing, based on the cell type, a connection between the UE and the cell. The method provides a comprehensive solution for facilitating better compatibility between RedCap UEs and network nodes that may not have been upgraded to support the RedCap features. It enhances network compatibility, reduces service delays, and improves the overall efficiency of wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions.

Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE). The method may include identifying, based on the support for the UE operating with reduced capability, a cell type of a cell, wherein the cell type is one of a reduced capability (RC) type, a fallback (FB) type, or a neither (N) type, wherein the RC type indicates a full support for the UE operating with the reduced capability, the FB type indicates a compatible support for the UE operating with the reduced capability and support for establishing a connection with the UE operating with the reduced capability, and the N type indicates the lack of support for the UE operating with the reduced capability and a lack of support for establishing the connection with the UE operating with the reduced capability; and managing, based on the cell type, a connection between the UE and the cell.

Aspect 2 is the method of aspect 1, wherein the method may further include: outputting an indication of the managed connection between the UE and the cell.

Aspect 3 is the method of aspect 2, wherein outputting the indication of the managed connection between the UE and the cell may include: transmitting the indication of the managed connection between the UE and the cell; or storing the indication of the managed connection between the UE and the cell.

Aspect 4 is the method of any of aspects 1 to 3, wherein the reduced capability may be an operational frequency bandwidth of the UE limited by the bandwidth threshold.

Aspect 5 is the method of aspect 4, wherein the bandwidth threshold may be 20 MHz.

Aspect 6 is the method of any of aspects 1 to 4, wherein identifying the cell type of the cell may include identifying a set of neighbor NR frequencies associated with the cell.

Aspect 7 is the method of aspect 6, wherein the set of neighbor NR frequencies may indicate at least one of neighbor cells is an NR cell, and the set of neighbor NR frequencies may include one or more of: a neighbor RC frequency indicating the cell type of the at least one of neighbor cells is the RC type, a neighbor FB frequency indicating the cell type of the at least one of neighbor cells is the FB type, or a neighbor N frequency indicating the cell types of the neighbor cells are not the RC type or the FB type.

Aspect 8 is the method of any of aspects 1 to 4, wherein the cell may be a New Radio (NR) cell, and wherein identifying the cell type of the cell may include receiving, from the cell, a system information block type 1 (SIB1) containing a first information element (IE) indicating the RC type; and identifying the cell type as the RC type based on the SIB1.

Aspect 9 is the method of aspect 8, wherein identifying the cell type of the cell may include: identifying, in response to the SIB1 not containing the first IE, the cell type as the N type based on the presence of one of a set of signature conditions, wherein the set of signature conditions may include: an initial bandwidth part (BWP) in the SIB1 larger than the bandwidth threshold, a failure in radio resource control (RRC) setup due to an invalid BWP or an invalid channel bandwidth (BW) configuration, a first reception of a first indication that indicates an RRC release, a second reception of a second indication that indicates an RRC reconfiguration or RRC resume indicating a channel BW larger than the bandwidth threshold and all BWPs larger than the bandwidth threshold, a handover (HO) to a second cell with an incorrect BWP, or a third reception of a third indication that indicates a post radio link failure (RLF) or a re-establishment failure.

Aspect 10 is the method of aspect 9, wherein identifying the cell type of the cell may include identifying, in response to an absence of all of the set of signature conditions, the cell type as the FB type.

Aspect 11 is the method of any of aspects 1 to 4, wherein the cell may be a Long-Term Evolution (LTE) cell, and wherein identifying the cell type of the cell may include identifying the cell type of the cell based on one of: a periodic LTE-to-New Radio (NR) background public land mobile network (BPLMN) search, or an LTE-to-NR (L2N) reselection, redirection, or handover to a second cell.

Aspect 12 is the method of any of aspects 1 to 11, wherein the method may further include: accessing a network capability database (DB), wherein the network capability DB may store cell information of a plurality of cells, wherein the information of the plurality of cells includes an associated cell type and an associated frequency for each cell of the plurality of cells, and wherein identifying the cell type of the cell may include: identifying the cell type of the cell based on the network capability DB.

Aspect 13 is the method of aspect 12, wherein the information of the plurality of cells may further include a set of neighbor NR frequencies associated with each cell of the plurality of cells.

Aspect 14 is the method of aspect 12, wherein the information of the plurality of cells may be obtained based on one or more of: a configuration comprising the information of the plurality of cells, a second network capability DB associated with a neighbor cell of the cell, or a third network capability DB associated with a second UE.

Aspect 15 is the method of aspect 12, wherein the method may further include: implementing a backoff mechanism for the network capability DB, wherein the backoff mechanism includes one or more of: a cell-level backoff, a frequency-level backoff, or a band-level backoff to limit access to one or more of the cells of the plurality of cells.

Aspect 16 is the method of aspect 15, wherein the cell-level backoff may include: limiting the access of the UE to one cell of the plurality of cells in the network capability DB for the first period of time.

Aspect 17 is the method of aspect 15, wherein the frequency-level backoff may include: limiting the access of the UE to one or more cells of the plurality of cells in the network capability DB operating at a frequency for the first period of time.

Aspect 18 is the method of aspect 15, wherein the band-level backoff may include: limiting the access of the UE to one or more cells of the plurality of cells associated with a band in the network capability DB for the second period of time.

Aspect 19 is the method of any of aspects 1 to 15, wherein managing the connection between the UE and the cell may include: managing a mobility procedure of the UE.

Aspect 20 is the method of aspect 19, wherein the cell may be a first cell of a first RAT or a second RAT, and wherein the mobility procedure of the UE may include one of: a reselection process for selecting a second cell from the plurality of cells for the UE, wherein the second cell is of the second RAT, a redirection process for selecting the second cell for the UE, a connected mode measurement process for selecting the second cell for the UE, a handover for selecting the second cell for the UE, an out-of-service (OOS) scan for selecting the second cell for the UE, a radio link failure (RLF) scan for selecting the second cell for the UE, or a power scan for selecting the second cell for the UE.

Aspect 21 is the method of aspect 20, wherein the first RAT may be LTE, and the second RAT may be NR.

Aspect 22 is the method of aspect 20, wherein managing the mobility procedure of the UE may include: assigning a priority to each cell of the plurality of cells based on the cell type of each cell, and wherein the second cell is selected based on the priority and a backoff status of each cell associated with the backoff mechanism.

Aspect 23 is the method of aspect 22, wherein a first priority for the RC type is higher than a second priority for the FB type, and wherein the second priority for the FB type is higher than a third priority for the N type.

Aspect 24 is the method of aspect 1, wherein the reduced capability may be the number of data radio bearers (DRB) limited by a DRB threshold.

Aspect 25 is the method of aspect 24, wherein the DRB threshold may be 8.

Aspect 26 is the method of aspect 1, wherein the reduced capability may be the length of a sequence number used in radio link control (RLC) and packet data convergence protocol (PDCP) layers limited by a length threshold.

Aspect 27 is an apparatus for wireless communication at a UE, comprising: at least one memory; and at least one processor coupled to the at least one memory and, based at least in part on information stored in the at least one memory, the at least one processor, individually or in any combination, is configured to perform the method of any of aspects 1-26.

Aspect 28 is the apparatus for wireless communication at a UE, comprising means for performing each step in the method of any of aspects 1-26.

Aspect 29 is an apparatus of any of aspects 27 to 28, further comprising a transceiver configured to receive or to transmit in association with the method of any of aspects 1-26.

Aspect 30 is a computer-readable medium (e.g., a non-transitory computer-readable medium) storing computer executable code at a UE, the code when executed by at least one processor causes the at least one processor to, individually or in any combination, perform the method of any of aspects 1-26.

Aspect 31 is a method of wireless communication at a network node. The method may include: configuring, based on a user equipment (UE) operating with reduced capability, a communication setting for the network node accommodating the reduced capability of the UE, wherein the communication setting reduces a communication capability of the network node; and communicating, based on the communication setting, with the UE.

Aspect 32 is the method of aspect 31, wherein the reduced capability includes one of: an operational frequency bandwidth of the UE limited by a bandwidth threshold, a number of data radio bearers (DRB) limited by a DRB threshold, or a length of a sequence number used in radio link control (RLC) and packet data convergence protocol (PDCP) layers limited by a length threshold.

Aspect 33 is an apparatus for wireless communication at a network node, comprising: at least one memory; and at least one processor coupled to the at least one memory and, based at least in part on information stored in the at least one memory, the at least one processor, individually or in any combination, is configured to perform the method of any of aspects 31-32.

Aspect 34 is the apparatus for wireless communication at a network node, comprising means for performing each step in the method of any of aspects 31-32.

Aspect 35 is an apparatus of any of aspects 33 to 34, further comprising a transceiver configured to receive or to transmit in association with the method of any of aspects 31-32.

Aspect 36 is a computer-readable medium (e.g., a non-transitory computer-readable medium) storing computer executable code at a network node, the code when executed by at least one processor causes the at least one processor to, individually or in any combination, perform the method of any of aspects 31-32.

Aspect 37 is a method of wireless communication at a user equipment (UE). The method may include identifying, based on a support of a cell for the UE operating with reduced capability, a cell type of the cell, wherein the cell type is one of a reduced capability (RC) type, a fallback (FB) type, or a neither (N) type, wherein the RC type indicates a full support for the UE operating with the reduced capability, the FB type indicates a compatible support for the UE operating with the reduced capability and a support for establishing a connection with the UE operating with the reduced capability, and the N type indicates the lack of the support for the UE operating with the reduced capability and a lack of the support for establishing the connection with the UE operating with the reduced capability; configuring a device mode of the UE, wherein the device mode includes an RC mode or a FB-allowed mode; and managing, based on the device mode and the cell type, the connection between the UE and the cell.

Aspect 38 is the method of aspect 37, where the method may further include outputting an indication of the managed connection between the UE and the cell.

Aspect 39 is the method of any of aspects 37 to 38, wherein the reduced capability may include one of: an operational frequency bandwidth of the UE limited by a bandwidth threshold, a number of data radio bearers (DRB) limited by a DRB threshold, or a length of a sequence number used in radio link control (RLC) and packet data convergence protocol (PDCP) layers limited by a length threshold.

Aspect 40 is the method of aspect 39, wherein the RC mode may indicate the UE operating with the reduced capability, and wherein the FB-allowed mode may indicate an enablement of the UE connecting with a target cell of the FB type.

Aspect 41 is the method of aspect 40, where the method may further include receiving a mode configuration indicating the device mode, and wherein configuring the device mode of the UE comprises: configuring, based on the mode configuration, the device mode of the UE.

Aspect 42 is the method of any of aspects 37 to 40, where the method may further include: storing a set of network identifiers, wherein each network identifier of the set of network identifiers has an associated device mode, and wherein configuring the device mode of the UE comprises configuring the device mode of the UE based on an association of the cell with the set of network identifiers.

Aspect 43 is the method of aspect 42, wherein each network identifier of the set of network identifiers includes one or more of: a public land mobile network (PLMN), a mobile country code, or a network operator.

Aspect 44 is the method of any of aspects 37 to 39, wherein configuring the device mode of the UE comprises: configuring the device mode of the UE as the FB-allowed mode, and wherein the method further comprises: updating a capability state of the UE, wherein the capability state includes an RC state indicating an activation of the UE operating with the reduced capability and a non-RC (NRC) state indicating an enablement of the UE connecting with a target cell of the FB type.

Aspect 45 is the method of aspect 44, wherein managing the connection between the UE and the cell comprises managing a mobility procedure of the UE with respect to a plurality of cells.

Aspect 46 is the method of aspect 45, wherein the cell is a first cell, and wherein the mobility procedure of the UE includes: a reselection process for selecting a second cell from the plurality of cells for the UE, a redirection process for selecting the second cell for the UE, a connected mode measurement process for selecting the second cell for the UE, a handover for selecting the second cell for the UE, an out-of-service (OOS) scan for selecting the second cell for the UE, a radio link failure (RLF) scan for selecting the second cell for the UE, or a power scan for selecting the second cell for the UE.

Aspect 47 is the method of aspect 46, wherein updating the capability state of the UE comprises: updating, via a mobility registration update, the capability state of the UE.

Aspect 48 is the method of aspect 46, wherein updating the capability state of the UE comprises: switching, in response to a first condition associated with the UE being met, the capability state of the UE from the RC state to the NRC state, or switching, in response to a second condition associated with the UE being met, the capability state of the UE from the NRC state to the RC state.

Aspect 49 is the method of aspect 48, wherein the first condition includes one or more of: the UE determining, based on system information block type 1 (SIB1) of the second cell, the second cell is not the RC type, the UE including an out-of-service (OOS) duration longer than a first time threshold, the UE identifying no cell in the plurality of cells as having the cell type of the RC type or a long-term evolution (LTE) type during a radio link failure (RLF) recovery process, and the UE identifying a first number of cells of an NRC type in the plurality of cells, the first number greater than a first counter threshold. The first condition may further include the UE connecting with an LTE cell of the LTE type for longer than a second time threshold, and a second number of neighbor cells of the NRC type in the plurality of cells being available, the second number greater than the first counter threshold.

Aspect 50 is the method of aspect 48, wherein the second condition includes one or more of: the UE determining, based on system information block type 1 (SIB1) of the second cell, the second cell is the RC type, the UE being connected with an LTE cell of a long-term evolution (LTE) type in the plurality of cells, and a number of available cells of the RC type in the plurality of cells being larger than a first threshold, or the UE being connected with an RC cell of the RC type in the plurality of cells, and the number of available cells of the RC type in the plurality of cells being larger than the first threshold.

Aspect 51 is the method of aspect 48, wherein updating the capability state of the UE comprises: setting the capability state of the UE to the RC state, and wherein managing the mobility procedure of the UE comprises: assigning a priority for each cell of the plurality of cells based on the cell type of each cell, and wherein a first priority for the RC type is higher than a second priority for the LTE type; and managing, in response to the second cell being one of the RC type or the LTE type, the mobility procedure of the UE based on the priority of the second cell.

Aspect 52 is the method of aspect 48, wherein updating the capability state of the UE comprises: setting the capability state of the UE to the NRC state, and wherein managing the mobility procedure of the UE comprises: assigning a priority for each cell of the plurality of cells based on the cell type of each cell, and wherein a first priority for the RC type is higher than a second priority for an NRC type, the second priority is higher than a third priority for an frequency division duplex (FDD) type, the third priority is higher than a fourth priority for a time division duplex (TDD) type, and the fourth priority is higher than a fifth priority for the LTE type; and managing the mobility procedure of the UE based on the priority for each cell of the plurality of cells.

Aspect 53 is the method of aspect 52, wherein managing the mobility procedure of the UE further comprises: limiting, in response to a failure of the mobility procedure of the UE, an access of the UE to one or more cells of the plurality of cells associated with a band for a first period of time.

Aspect 54 is an apparatus for wireless communication at a UE, comprising: a processing system that includes processor circuitry and memory circuitry that stores code and is coupled with the processor circuitry, the processing system configured to cause the UE to perform the method of one or more of Aspects 37-53.

Aspect 55 is an apparatus for wireless communication at a UE, comprising: at least one memory; and at least one processor coupled to the at least one memory and, where the at least one processor, individually or in any combination, is configured to perform the method of any of aspects 37-53.

Aspect 56 is the apparatus for wireless communication at a UE, comprising means for performing each step in the method of any of aspects 37-53.

Aspect 57 is an apparatus of any of aspects 54-56, further comprising a transceiver configured to receive or to transmit in association with the method of any of aspects 37-53.

Aspect 58 is a computer-readable medium (e.g., a non-transitory computer-readable medium) storing computer executable code at a UE, the code when executed by at least one processor causes the at least one processor to, individually or in any combination, perform the method of any of aspects 37-53.

Aspect 59 is a method of wireless communication at a network entity. The method includes configuring, based on a user equipment (UE) operating with a reduced capability, a communication setting for the network node accommodating the reduced capability of the UE, wherein the communication setting reduces a communication capability of the network node; and communicating, based on the communication setting and a device mode of the UE, with the UE, wherein the device mode includes a reduced capability (RC) mode or a fallback (FB)-allowed mode.

Aspect 60 is the method of aspect 59, wherein the reduced capability of the UE includes one of: an operational frequency bandwidth of the UE limited by a bandwidth threshold, a number of data radio bearers (DRB) limited by a DRB threshold, or a length of a sequence number used in radio link control (RLC) and packet data convergence protocol (PDCP) layers limited by a length threshold.

Aspect 61 is the method of aspect 60, wherein the RC mode indicates the UE operating with the reduced capability, and wherein the FB-allowed mode indicates an enablement of the UE connecting with a target cell of a fallback (FB) type.

Aspect 62 is the method of aspect 61, where the method may further include transmitting, for the UE, a mode configuration indicating the device mode.

Aspect 63 is the method of aspect 61, wherein the device mode may be based on an association of the network node with a set of network identifiers.

Aspect 64 is the method of aspect 63, wherein each network identifier of the set of network identifiers includes one or more of: a public land mobile network (PLMN), a mobile country code, or a network operator.

Aspect 65 is an apparatus for wireless communication at a network entity, comprising: a processing system that includes processor circuitry and memory circuitry that stores code and is coupled with the processor circuitry, the processing system configured to cause the network entity to perform the method of one or more of aspects 59-64.

Aspect 66 is an apparatus for wireless communication at a network entity, comprising: at least one memory; and at least one processor coupled to the at least one memory and, where the at least one processor, individually or in any combination, is configured to perform the method of any of aspects 59-64.

Aspect 67 is the apparatus for wireless communication at a network entity, comprising means for performing each step in the method of any of aspects 59-64.

Aspect 68 is an apparatus of any of aspects 65-67, further comprising a transceiver configured to receive or to transmit in association with the method of any of aspects 59-64.

Aspect 69 is a computer-readable medium (e.g., a non-transitory computer-readable medium) storing computer executable code at a network entity, the code when executed by at least one processor causes the at least one processor to, individually or in any combination, perform the method of any of aspects 59-64.

What is claimed is:

1. An apparatus of wireless communication at a user equipment (UE), comprising:

at least one memory; and at least one processor coupled to the at least one memory and, based at least in part on information stored in the at least one memory, the at least one processor is configured to:

identify, based on a support of a cell for the UE operating with reduced capability, a cell type of the cell, wherein the cell type is one of a reduced capability (RC) type, a fallback (FB) type, or a neither (N) type, wherein the RC type indicates a full support for the UE operating with the reduced capability, the FB type indicates a compatible support for the UE operating with the reduced capability and a support for establishing a connection with the UE operating with the reduced capability, and the N type indicates a lack of the support for the UE operating with the reduced capability and a lack of the support for establishing the connection with the UE operating with the reduced capability;

configure a device mode of the UE, wherein the device mode includes an RC mode or a FB-allowed mode; and manage, based on the device mode of the UE, a capability state of the UE, and the cell type, the connection between the UE and the cell, wherein the capability state is associated with the device mode of the UE, and the capability state includes an RC state indicating an activation of the UE operating with the reduced capability and a non-RC (NRC) state indicating an enablement of the UE connecting with a target cell of the FB type.

2. The apparatus of claim 1, wherein the at least one processor is further configured to:

output an indication of the managed connection between the UE and the cell.

3. The apparatus of claim 1, wherein the reduced capability includes one of:

an operational frequency bandwidth of the UE limited by a bandwidth threshold, a number of data radio bearers (DRB) limited by a DRB threshold, or a length of a sequence number used in radio link control (RLC) and packet data convergence protocol (PDCP) layers limited by a length threshold.

4. The apparatus of claim 3, wherein the RC mode indicates the UE operating with the reduced capability, and wherein the FB-allowed mode indicates the enablement of the UE connecting with the target cell of the FB type.

5. The apparatus of claim 4, wherein the at least one processor is further configured to:

receive a mode configuration indicating the device mode, and wherein to configure the device mode of the UE, the at least one processor is configured to:

configure, based on the mode configuration, the device mode of the UE.

6. The apparatus of claim 4, wherein the at least one processor is further configured to:

store a set of network identifiers, wherein each network identifier of the set of network identifiers has an associated device mode, and wherein to configure the device mode of the UE, the at least one processor is configured to:

configure the device mode of the UE based on an association of the cell with the set of network identifiers.

7. The apparatus of claim 6, wherein each network identifier of the set of network identifiers includes one or more of:

a public land mobile network (PLMN), a mobile country code, or a network operator.

8. The apparatus of claim 3, wherein to configure the device mode of the UE, the at least one processor is configured to:

configure the device mode of the UE as the FB-allowed mode, and wherein the at least one processor is further configured to:

update the capability state of the UE.

9. The apparatus of claim 8, wherein to manage the connection between the UE and the cell, the at least one processor is configured to:

manage a mobility procedure of the UE with respect to a plurality of cells.

10. The apparatus of claim 9, wherein the cell is a first cell, and wherein the mobility procedure of the UE includes:

a reselection process for selecting a second cell from the plurality of cells for the UE, a redirection process for selecting the second cell for the UE, a connected mode measurement process for selecting the second cell for the UE, a handover for selecting the second cell for the UE, an out-of-service (OOS) scan for selecting the second cell for the UE, a radio link failure (RLF) scan for selecting the second cell for the UE, or a power scan for selecting the second cell for the UE.

11. The apparatus of claim 10, wherein to update the capability state of the UE, the at least one processor is configured to:

update, via a mobility registration update, the capability state of the UE.

12. The apparatus of claim 10, wherein to update the capability state of the UE, the at least one processor is configured to:

switch, in response to a first condition associated with the UE being met, the capability state of the UE from the RC state to the NRC state, or switch, in response to a second condition associated with the UE being met, the capability state of the UE from the NRC state to the RC state.

13. The apparatus of claim 12, wherein the first condition includes one or more of:

the UE determining, based on system information block type 1 (SIB1) of the second cell, the second cell is not the RC type, the UE including an out-of-service (OOS) duration longer than a first time threshold, the UE identifying no cell in the plurality of cells as having the cell type of the RC type or a long-term evolution (LTE) type during a radio link failure (RLF) recovery process, and the UE identifying a first number of cells of an NRC type in the plurality of cells, the first number greater than a first counter threshold, or the UE connecting with an LTE cell of the LTE type for longer than a second time threshold, and a second number of neighbor cells of the NRC type in the plurality of cells being available, the second number greater than the first counter threshold.

14. The apparatus of claim 12, wherein the second condition includes one or more of:

the UE determining, based on system information block type 1 (SIB1) of the second cell, the second cell is the RC type, the UE being connected with an LTE cell of a long-term evolution (LTE) type in the plurality of cells, and a number of available cells of the RC type in the plurality of cells being larger than a first threshold, or the UE being connected with an RC cell of the RC type in the plurality of cells, and the number of available cells of the RC type in the plurality of cells being larger than the first threshold.

15. The apparatus of claim 12, wherein to update the capability state of the UE, the at least one processor is configured to:

set the capability state of the UE to the RC state, and wherein to manage the mobility procedure of the UE, the at least one processor is configured to:

assign a priority for each cell of the plurality of cells based on the cell type of each cell, and wherein a first priority for the RC type is higher than a second priority for a long-term evolution (LTE) type; and manage, in response to the second cell being one of the RC type or the LTE type, the mobility procedure of the UE based on the priority of the second cell.

16. The apparatus of claim 12, wherein to update the capability state of the UE, the at least one processor is configured to:

set the capability state of the UE to the NRC state, and wherein to manage the mobility procedure of the UE, the at least one processor is configured to:

assign a priority for each cell of the plurality of cells based on the cell type of each cell, and wherein a first priority for the RC type is higher than a second priority for an NRC type, the second priority is higher than a third priority for an frequency division duplex (FDD) type, the third priority is higher than a fourth priority for a time division duplex (TDD) type, and the fourth priority is higher than a fifth priority for a long-term evolution (LTE) type; and manage the mobility procedure of the UE based on the priority for each cell of the plurality of cells.

17. The apparatus of claim 16, wherein to manage the mobility procedure of the UE, the at least one processor is configured to:

limit, in response to a failure of the mobility procedure of the UE, an access of the UE to one or more cells of the plurality of cells associated with a band for a first period of time.

18. An apparatus of wireless communication at a network node, comprising:

at least one memory; and at least one processor coupled to the at least one memory and, based at least in part on information stored in the at least one memory, the at least one processor is configured to:

configure, based on a user equipment (UE) operating with a reduced capability, a communication setting for the network node accommodating the reduced capability of the UE, wherein the communication setting reduces a communication capability of the network node; and communicate, based on the communication setting, a capability state of the UE, and a device mode of the UE, with the UE, wherein the device mode includes a reduced capability (RC) mode or a fallback (FB)-allowed mode, wherein the capability state is associated with the device mode of the UE, and the capability state includes an RC state indicating an activation of the UE operating with the reduced capability and a non-RC (NRC) state indicating an enablement of the UE connecting with a target cell of the FB type.

19. The apparatus of claim 18, wherein the reduced capability of the UE includes one of:

an operational frequency bandwidth of the UE limited by a bandwidth threshold, a number of data radio bearers (DRB) limited by a DRB threshold, or a length of a sequence number used in radio link control (RLC) and packet data convergence protocol (PDCP) layers limited by a length threshold.

20. A method of wireless communication at a user equipment (UE), comprising:

identifying, based on a support of a cell for the UE operating with reduced capability, a cell type of the cell, wherein the cell type is one of a reduced capability (RC) type, a fallback (FB) type, or a neither (N) type, wherein the RC type indicates a full support for the UE operating with the reduced capability, the FB type indicates a compatible support for the UE operating with the reduced capability and a support for establishing a connection with the UE operating with the reduced capability, and the N type indicates a lack of the support for the UE operating with the reduced capability and a lack of the support for establishing the connection with the UE operating with the reduced capability;

configuring a device mode of the UE, wherein the device mode includes an RC mode or a FB-allowed mode; and managing, based on the device mode of the UE, a capability state of the UE, and the cell type, the connection between the UE and the cell, wherein the capability state is associated with the device mode of the UE, and the capability state includes an RC state indicating an activation of the UE operating with the reduced capability and a non-RC (NRC) state indicating an enablement of the UE connecting with a target cell of the FB type.

* * * * *